United States Patent
Zhang

(10) Patent No.: US 11,438,125 B2
(45) Date of Patent: Sep. 6, 2022

(54) METHOD AND DEVICE IN UE AND BASE STATION USED FOR WIRELESS COMMUNICATION

(71) Applicant: Xiaobo Zhang, Shanghai (CN)

(72) Inventor: Xiaobo Zhang, Shanghai (CN)

(73) Assignee: SHANGHAI LANGBO COMMUNICATION TECHNOLOGY COMPANY LIMIIED, Shanghai (CN)

( * ) Notice: Subject to any disclaimer, the term of this patent is extended or adjusted under 35 U.S.C. 154(b) by 95 days.

(21) Appl. No.: 17/005,345

(22) Filed: Aug. 28, 2020

(65) Prior Publication Data

US 2020/0396042 A1 Dec. 17, 2020

Related U.S. Application Data

(63) Continuation of application No. PCT/CN2019/077579, filed on Mar. 9, 2019.

(30) Foreign Application Priority Data

Mar. 12, 2018 (CN) .......................... 201810200864.6

(51) Int. Cl.
 *H04L 5/00* (2006.01)
 *H04B 7/0413* (2017.01)
 (Continued)

(52) U.S. Cl.
 CPC .......... *H04L 5/0055* (2013.01); *H04B 7/0413* (2013.01); *H04L 1/1812* (2013.01); *H04L 5/0005* (2013.01); *H04W 72/042* (2013.01)

(58) Field of Classification Search
 CPC ..... H04L 5/0055; H04L 1/1812; H04L 5/005; H04B 7/0413; H04W 72/042
 See application file for complete search history.

(56) References Cited

U.S. PATENT DOCUMENTS

| 2015/0003305 A1 | 1/2015 | Park et al. |
| 2018/0019843 A1* | 1/2018 | Papasakellariou .......................... H04W 72/1278 |
| 2019/0191433 A1* | 6/2019 | Park .................... H04L 27/2602 |

FOREIGN PATENT DOCUMENTS

| CN | 107645777 A | 1/2018 |
| CN | 107659389 A | 2/2018 |

(Continued)

OTHER PUBLICATIONS

CN First Search Report in application No. 201810200864.6 dated Dec. 26, 2019.

(Continued)

*Primary Examiner* — Brenda H Pham

(57) ABSTRACT

The present disclosure discloses a method and a device in a User Equipment (UE) and a base station used for wireless communication. In one embodiment, the UE monitors a first-type signaling and a second-type signaling in first time-frequency sub-resources and second time-frequency sub-resources respectively; and transmits a first information group; wherein a first signaling is received in first time-frequency sub-resources, and the first signaling is a first-type signaling; a transmitter of the first-type signaling and a transmitter of the second-type signaling are a same serving cell; the first information group is used for indicating whether scheduling of the first signaling is correctly received; the first signaling comprises a first field. The present disclosure can support the dynamic scheduling from multiple TRPs with non-ideal backhaul to a UE, so as to improve transmission efficiency.

20 Claims, 14 Drawing Sheets

(51) Int. Cl.
*H04L 1/18* (2006.01)
*H04W 72/04* (2009.01)

(56) References Cited

FOREIGN PATENT DOCUMENTS

CN 107690188 A 2/2018
EP 2916601 A 11/2015

OTHER PUBLICATIONS

CN First Office Action in Application No. 201810200864.6 dated Jan. 6, 2020.
CN Second Office Action in Application No. 201810200864.6 dated Jul. 1, 2020.
ISR in application PCT/CN2017/2019/077579 dated May 9, 2019.
CN Notice of Allowance in Application No. 201810200864.6 dated Aug. 5, 2020.
CN Supplement Search Report in application No. 201810200864.6 dated Jul. 28, 2020.

\* cited by examiner

METHOD AND DEVICE IN UE AND BASE STATION USED FOR WIRELESS COMMUNICATION

CROSS REFERENCE TO RELATED APPLICATIONS

This application is a continuation of International Application No. PCT/CN2019/077579, filed Mar. 9, 2019, claims the priority benefit of Chinese Patent Application No. 201810200864.6, filed on Mar. 12, 2018, the full disclosure of which is incorporated herein by reference.

BACKGROUND

Technical Field

The present disclosure relates to transmission methods and devices in wireless communication systems, and in particular to a communication method and device relevant with Hybrid Automatic Repeat reQuest (HARQ).

Related Art

Hybrid Automatic Repeat reQuest (HARQ) is an important technology in wireless communications, which can improve transmission efficiency and robustness.

In typical cellular systems, such as in 3rd Generation Partner Project (3GPP) Long Term Evolution (LTE) system and New Radio (NR) systems, Downlink Grant Downlink Control Information (DCI) includes a Downlink Assignment Index (DAI) field for supporting Codebook-based HARQ-ACK.

Massive Multiple-Input Multiple-Output (MIMO) is another key technology in wireless communications, which can significantly improve system capacity. The antenna array in Massive MIMO may be distributed in multiple Transmitting and Receiving Points (TRP), and each of the multiple TRPs can transmit a control signaling for a DownLink Grant.

SUMMARY

The inventors have found through researches that backhauls between multiple TRPs that constitute a serving cell are non-ideal, dynamic scheduling between TRPs may be independent of each other, while traditional DAI counting does not distinguish TRPs, so there will be a problem that DAIs between multiple TRPs cannot be coordinated.

In view of the above problem, the present disclosure provides a solution. It should be noted that, in the case of no conflict, the embodiments of the present disclosure and the features in the embodiments may be combined with each other arbitrarily. Further, although the original intention of the present disclosure is for Massive MIMO, methods and devices in the present disclosure are also applicable to wireless communications based on single antenna.

The present disclosure provides a method in a User Equipment (UE) for wireless communication, comprising:
monitoring a first-type signaling and a second-type signaling in first time-frequency sub-resources and second time-frequency sub-resources respectively; a first signaling being received in the first time-frequency sub-resources, the first signaling being a first-type signaling; and
transmitting a first information group;
wherein the first-type signaling is a physical-layer signaling for a Downlink Grant or a physical-layer signaling for a Semi-Persistent Scheduling (SPS) Release, and the second-type signaling is a physical-layer signaling for a Downlink Grant or a physical-layer signaling for a SPS Release; a transmitter of the first-type signaling and a transmitter of the second-type signaling are a same serving cell; the first information group is used for indicating whether scheduling of the first signaling is correctly received; the first signaling comprises a first field, a value of the first field in the first signaling is related to a number of the first-type signaling(s) transmitted in the first time-frequency sub-resources, and the value of the first field in the first signaling is independent of a number of the second-type signaling(s) transmitted in the second time-frequency sub-resources; the second time-frequency sub-resources comprises a first time, the first time being between a first reference time and a second reference time, the first reference time and the second reference time being a start time and an end time of the first time-frequency sub-resources respectively.

In one embodiment, a direct backhaul between a transmitter of the first-type signaling and a transmitter of the second-type signaling is non-ideal, and a transmitter of the first-type signaling cannot count the second-type signaling; the above method enables that the first-type signaling and the second-type signaling can be counted independently, and a transmitter of the first-type signaling and a transmitter of the second-type signaling can independently schedule the UE in the name of a serving cell.

In one embodiment, the physical-layer signaling is a PHY1 signaling.

In one embodiment, the physical-layer signaling is a L1 signaling.

In one embodiment, the first-type signaling is transmitted on a Physical Downlink Control CHannel (PDCCH), and the second-type signaling is transmitted on a PDCCH.

Specifically, according to one aspect of the present disclosure, comprising:
receiving a first radio signal, the first signaling comprising configuration information of the first radio signal, a first bit block being used for generating the first radio signal, the first information group being used for indicating whether the first bit block is correctly received; or, performing a SPS Release, the first information group being used for indicating that the first signaling is correctly received.

In one embodiment, if the UE performs a SPS Release, the first information group indicates that scheduling of the first signaling is correctly received.

In one embodiment, for the UE, the performing a SPS Release includes: before receiving a new SPS assignment signaling, stopping reception of downlink data scheduled by a target signaling transmitted by the same serving cell, the target signaling being recently received DCI for a SPS assignment.

In one embodiment, for the UE, the performing a SPS Release includes: performing an instruction of the first signaling.

In one embodiment, the target signaling is transmitted on a Physical Downlink Control CHannel (PDCCH) or an Enhanced PDCCH (EPDCCH).

In one embodiment, a transmission channel corresponding to the downlink data is a Downlink Shared Channel (DL-SCH).

In one embodiment, the downlink data is transmitted on a Physical Downlink Shared Channel (PDSCH).

In one embodiment, the first radio signal is an output after the first bit block is sequentially subjected to channel coding, scrambling, a modulation mapper, a layer mapper, precoding, code division multiplexing, a resource element mapper, and wideband-symbol generation.

In one embodiment, the first radio signal is an output after the first bit block is subjected to channel coding, scrambling, a modulation mapper, a layer mapper, a transform precoder (which is configured to generate a complex value signal), precoding, code division multiplexing, a resource element mapper, and wideband-symbol generation.

Specifically, according to one aspect of the present disclosure, comprising:

receiving a first downlink information group;

wherein the first downlink information group is used for indicating a target time-frequency-resource set, the target time-frequency-resource set comprising the first time-frequency sub-resources; and the first field in the first signaling is used for determining at least one of the following:

an accumulative number of serving cell-PDCCH (Physical Downlink Control CHannel) monitoring occasion pair(s) in which the first-type signaling is present up to a current serving cell and a current PDCCH monitoring occasion in a first time window, first in ascending order of serving cell index and then in ascending order of PDCCH monitoring occasion index;

a total number of serving cell-PDCCH monitoring occasion pair(s) in which the first-type signaling is present up to a current PDCCH monitoring occasion in the first time window.

Specifically, according to one aspect of the present disclosure, comprising:

receiving P downlink information groups, P being a positive integer greater than 1;

wherein the P downlink information groups are used for indicating P time-frequency resources respectively, any of the P time-frequency resources being reserved for one of the first-type signaling or the second-type signaling; there exists two time-frequency resources of the P time-frequency resources being reserved for the first-type signaling and the second-type signaling respectively; the two time-frequency resources respectively comprise the first time-frequency sub-resources and the second time-frequency sub-resources.

Specifically, according to one aspect of the present disclosure, wherein the first-type signaling and the second-type signaling both comprise a target field; the target field is used for indicating a candidate signaling type corresponding to a physical-layer signaling to which it belongs out of Q2 candidate signaling types; the Q2 is a positive integer greater than 1, and the first-type signaling and the second-type signaling are one candidate signaling type among the Q2 candidate signaling types respectively.

Specifically, according to one aspect of the present disclosure, wherein the first information group comprises L pieces of sub-information, among which only one piece of sub-information is used for indicating whether scheduling of the first signaling is correctly received; first sub-information in the first signaling is used for determining the one piece of sub-information out of the L pieces of sub-information, or first sub-information in the first signaling is used for indicating the L; the first information group is transmitted on a physical-layer channel; the L is a positive integer greater than 1; at least one piece of the L pieces of sub-information in the first information group is used for indicating whether the scheduling of the second-type signaling is correctly received.

In one embodiment, compared with various access technologies supported by a serving cell, such as enhanced Mobile Broad Band (eMBB) and Ultra Reliable Low Latency (URLLC). The above aspect allows sub-information for the first-type signaling and sub-information for the second-type signaling to be carried by a physical-layer channel, which can obtain higher coding gains and improve transmission efficiency.

Specifically, according to one aspect of the present disclosure, wherein the first-type signaling may be any DCI format among P1 DCI format(s), and the second-type signaling may be any DCI format among P2 DCI format(s); at least one common DCI format is comprised in the P1 DCI format(s) and the P2 DCI format(s), the P1 and P2 being positive integers respectively.

In one embodiment, the one type of common DCI format is DCI format 1_0 in New Radio (NR).

In one embodiment, the one type of common DCI format is DCI format 1_1 in NR.

The present disclosure discloses a method in a base station for wireless communication, comprising:

transmitting a first signaling in first time-frequency sub-resources, the first signaling being a first-type signaling; and receiving a first information group;

wherein first time-frequency sub-resources and second time-frequency sub-resources are reserved for a first-type signaling and a second-type signaling respectively; the first-type signaling is a physical-layer signaling for downlink grant or a physical-layer signaling for a SPS Release, and the second-type signaling is a physical-layer signaling for downlink grant or a physical-layer signaling for a SPS Release; a transmitter of the first-type signaling and a transmitter of the second-type signaling are a same serving cell; the first information group is used for indicating whether scheduling of the first signaling is correctly received; the first signaling comprises a first field, a value of the first field in the first signaling is related to a number of the first-type signaling(s) transmitted in the first time-frequency sub-resources, and the value of the first field in the first signaling is independent of a number of the second-type signaling(s) transmitted in the second time-frequency sub-resources; the second time-frequency sub-resources comprises a first time, the first time being between a first reference time and a second reference time; the first reference time and the second reference time are a start time and an end time of the first time-frequency sub-resources respectively.

In one embodiment, the phrase that first time-frequency sub-resources and second time-frequency sub-resources are reserved for a first-type signaling and a second-type signaling respectively refers to: the base station may transmit the first-type signaling in the first time-frequency sub-resources, and the base station may transmit the second-type signaling in the second time-frequency sub-resources.

In one embodiment, first time-frequency sub-resources and second time-frequency sub-resources are reserved for a first-type signaling and a second-type signaling respectively, comprising: a UE performs a blind decoding in the first time-frequency sub-resources for determining whether the base station transmits the first-type signaling, and the UE performs a blind detection in the second time-frequency sub-resources for determining whether the base station transmits the second-type signaling.

In one embodiment, the same serving cell is maintained by the base station.

Specifically, according to one aspect of the present disclosure, comprising:

transmitting a first radio signal, the first signaling comprising configuration information of the first radio signal, a first bit block being used for generating the first radio signal, the first information group being used for indicating whether the first bit block is correctly received; or, performing a SPS Release, the first information group being used for indicating that the first signaling is correctly received.

In one embodiment, after the first information group is received and the first information group indicates that scheduling of the first signaling is correctly received, the base station performs a SPS Release.

In one embodiment, before receiving the first information group, the base station performs a SPS Release.

In one embodiment, for the base station, the performing a SPS Release comprises: before transmitting a new SPS assignment signaling, stopping transmission of downlink data scheduled by a target signaling in the same serving cell, and the target signaling is recently transmitted DCI for a SPS assignment.

In one embodiment, the performing a SPS Release comprises: before transmitting a new SPS assignment signaling, stopping transmission of downlink data scheduled by a target signaling in the same serving cell, and the target signaling is recently transmitted DCI for a SPS assignment.

In one embodiment, the target signaling is identified by a Radio Network Temporary Identifier (SPS-RNTI).

Specifically, according to one aspect of the present disclosure, comprising:

transmitting a first downlink information group;

wherein the first downlink information group is used for indicating a target time-frequency-resource set, the target time-frequency-resource set comprising the first time-frequency sub-resources; and the first field in the first signaling is used for determining at least one of the following:

an accumulative number of serving cell-PDCCH monitoring occasion pair(s) in which the first-type signaling is present up to a current serving cell and a current PDCCH monitoring occasion in a first time window, first in ascending order of serving cell index and then in ascending order of PDCCH monitoring occasion index;

a total number of serving cell-PDCCH monitoring occasion pair(s) in which the first-type signaling is present up to a current PDCCH monitoring occasion in the first time window.

Specifically, according to one aspect of the present disclosure, comprising:

transmitting P downlink information groups, P being a positive integer greater than 1;

wherein the P downlink information groups are used for indicating P time-frequency resources respectively, any of the P time-frequency resources being reserved for one of the first-type signaling or the second-type signaling; there exists two time-frequency resources of the P time-frequency resources being reserved for the first-type signaling and the second-type signaling respectively; the two time-frequency resources respectively comprise the first time-frequency sub-resources and the second time-frequency sub-resources.

Specifically, according to one aspect of the present disclosure, wherein the first-type signaling and the second-type signaling both comprise a target field; the target field is used for indicating a candidate signaling type corresponding to a physical-layer signaling to which it belongs out of Q2 candidate signaling types; the Q2 is a positive integer greater than 1, and the first-type signaling and the second-type signaling are one candidate signaling type among the Q2 candidate signaling types respectively.

Specifically, according to one aspect of the present disclosure, wherein the first information group comprises L pieces of sub-information, among which only one piece of sub-information is used for indicating whether scheduling of the first signaling is correctly received; first sub-information in the first signaling is used for determining the one piece of sub-information out of the L pieces of sub-information, or first sub-information in the first signaling is used for indicating the L; the first information group is transmitted on a physical-layer channel; the L is a positive integer greater than 1; at least one piece of the L pieces of sub-information in the first information group is used for indicating whether the scheduling of the second-type signaling is correctly received.

Specifically, according to one aspect of the present disclosure, wherein the first-type signaling may be any DCI format among P1 DCI format(s), and the second-type signaling may be any DCI format among P2 DCI format(s); at least one common DCI format is comprised in the P1 DCI format(s) and the P2 DCI format(s), the P1 and P2 being positive integers respectively.

The present disclosure provides a UE for wireless communication, comprising:

a first receiver: monitoring a first-type signaling and a second-type signaling in first time-frequency sub-resources and second time-frequency sub-resources respectively; a first signaling is received in the first time-frequency sub-resources, the first signaling being a first-type signaling; and a first transmitter: transmitting a first information group;

wherein the first-type signaling is a physical-layer signaling for downlink grant or a physical-layer signaling for a SPS Release, and the second-type signaling is a physical-layer signaling for downlink grant or a physical-layer signaling for a SPS Release; a transmitter of the first-type signaling and a transmitter of the second-type signaling are a same serving cell; the first information group is used for indicating whether scheduling of the first signaling is correctly received; the first signaling comprises a first field, a value of the first field in the first signaling is related to a number of the first-type signaling(s) transmitted in the first time-frequency sub-resources, and the value of the first field in the first signaling is independent of a number of the second-type signaling(s) transmitted in the second time-frequency sub-resources; the second time-frequency sub-resources comprises a first time, the first time being between a first reference time and a second reference time; the first reference time and the second reference time are a start time and an end time of the first time-frequency sub-resources respectively.

In one embodiment, the above UE for wireless communication is characterized in comprising:

a second receiver: receiving a first radio signal, the first signaling comprising configuration information of the first radio signal, a first bit block being used for generating the first radio signal, the first information group being used for indicating whether the first bit block is correctly received; or, performing a SPS Release, the first information group being used for indicating that the first signaling is correctly received.

In one embodiment, the above UE for wireless communication is characterized in comprising:

a second receiver: receiving a first downlink information group; herein, the first downlink information group is used for indicating a target time-frequency-resource set, the target time-frequency-resource set comprising the first time-frequency sub-resources; and the first field in the first signaling is used for determining at least one of the following:

an accumulative number of serving cell-PDCCH monitoring occasion pair(s) in which the first-type signaling is present up to a current serving cell and a current PDCCH monitoring occasion in a first time window, first in ascending order of serving cell index and then in ascending order of PDCCH monitoring occasion index;

a total number of serving cell-PDCCH monitoring occasion pair(s) in which the first-type signaling is present up to a current PDCCH monitoring occasion in the first time window.

In one embodiment, the above UE for wireless communication is characterized in comprising:

a second receiver; receiving P downlink information groups, P being a positive integer greater than 1; wherein the P downlink information groups are used for indicating P time-frequency resources respectively, any of the P time-frequency resources being reserved for one of the first-type signaling or the second-type signaling; there exists two time-frequency resources of the P time-frequency resources being reserved for the first-type signaling and the second-type signaling respectively; the two time-frequency resources comprise the first time-frequency sub-resources and the second time-frequency sub-resources respectively.

In one embodiment, the above UE used for wireless communication is characterized in that both the first-type signaling and the second-type signaling comprise a target field; the target field is used for indicating a candidate signaling type corresponding to a physical-layer signaling to which it belongs out of Q2 candidate signaling types, the Q2 being a positive integer greater than 1, and the first-type signaling and the second-type signaling are one candidate signaling type among the Q2 candidate signaling types respectively.

In one embodiment, the above UE for wireless communication is characterized in that the first information group comprises L pieces of sub-information, among which only one piece of sub-information is used for indicating whether scheduling of the first signaling is correctly received; first sub-information in the first signaling is used for determining the one piece of sub-information out of the L pieces of sub-information, or first sub-information in the first signaling is used for indicating the L; the first information group is transmitted on a physical-layer channel; the L is a positive integer greater than 1; at least one piece of the L pieces of sub-information in the first information group is used for indicating whether the scheduling of the second-type signaling is correctly received.

In one embodiment, the above UE for wireless communication is characterized in that the first-type signaling may be any DCI format among P1 DCI format(s), and the second-type signaling may be any DCI format among P2 DCI format(s); at least one common DCI format is comprised in the P1 DCI format(s) and the P2 DCI format(s), the P1 and P2 being positive integers respectively.

The present disclosure provides a base station for wireless communication, comprising:

a second transmitter: transmitting a first signaling in first time-frequency sub-resources, the first signaling being a first-type signaling;

a third receiver: receiving a first information group;

wherein first time-frequency sub-resources and second time-frequency sub-resources are reserved for a first-type signaling and a second-type signaling respectively; the first-type signaling is a physical layer signaling for downlink grant or a physical layer signaling for a SPS Release, and the second-type signaling is a physical layer signaling for downlink grant or a physical layer signaling for a SPS Release; a transmitter of the first-type signaling and a transmitter of the second-type signaling are a same serving cell; the first information group is used for indicating whether scheduling of the first signaling is correctly received; the first signaling comprises a first field, a value of the first field in the first signaling is related to a number of the first-type signaling(s) transmitted in the first time-frequency sub-resources, and the value of the first field in the first signaling is independent of a number of the second-type signaling(s) transmitted in the second time-frequency sub-resources; the second time-frequency sub-resources comprises a first time, the first time being between a first reference time and a second reference time; the first reference time and the second reference time are a start time and an end time of the first time-frequency sub-resources respectively.

In one embodiment, the base station used for wireless communication is characterized in comprising:

a third transmitter: transmitting a first radio signal, the first signaling comprising configuration information of the first radio signal, a first bit block being used for generating the first radio signal, the first information group being used for indicating whether the first bit block being correctly received; or, performing a SPS Release, the first information group being used for indicating that the first signaling being correctly received.

In one embodiment, the base station for wireless communication is characterized in comprising:

a third transmitter: transmitting a first downlink information group; wherein the first downlink information group is used for indicating a target time-frequency-resource set, the target time-frequency-resource set comprising the first time-frequency sub-resources; and the first field in the first signaling is used for determining at least one of the following:

an accumulative number of serving cell-PDCCH monitoring occasion pair(s) in which the first-type signaling is present up to a current serving cell and a current PDCCH monitoring occasion in a first time window, first in ascending order of serving cell index and then in ascending order of PDCCH monitoring occasion index;

a total number of serving cell-PDCCH monitoring occasion pair(s) in which the first-type signaling is present up to a current PDCCH monitoring occasion in the first time window.

In one embodiment, the base station for wireless communication is characterized in comprising:

a third transmitter: transmitting P downlink information groups, P being a positive integer greater than 1; wherein the P downlink information groups are used for indicating P time-frequency resources respectively, any of the P time-frequency resources being reserved for one of the first-type signaling or the second-type signaling; there exists two time-frequency resources of the P time-frequency resources being reserved for the first-type signaling and the second-type signaling respectively; the two time-frequency resources comprise the first time-frequency sub-resources and the second time-frequency sub-resources respectively.

In one embodiment, the above base station used for wireless communication is characterized in that both the first-type signaling and the second-type signaling comprise a target field; the target field is used for indicating a candidate signaling type corresponding to a physical layer signaling to which it belongs out of Q2 candidate signaling types; the Q2 is a positive integer greater than 1, and the first-type signaling and the second-type signaling are one candidate signaling type among the Q2 candidate signaling types respectively.

In one embodiment, the above base station used for wireless communication is characterized in that the first information group comprises L pieces of sub-information, among which only one piece of sub-information is used for indicating whether scheduling of the first signaling is correctly received; first sub-information in the first signaling is used for determining the one piece of sub-information out of the L pieces of sub-information, or first sub-information in the first signaling is used for indicating the L; the first information group is transmitted on a physical-layer channel; the L is a positive integer greater than 1; at least one piece of the L pieces of sub-information in the first information group is used for indicating whether the scheduling of the second-type signaling is correctly received.

In one embodiment, the above base station used for wireless communication is characterized in that the first-type signaling may be any DCI format among P1 DCI format(s), and the second-type signaling may be any DCI format among P2 DCI format(s); at least one common DCI format is comprised in the P1 DCI format(s) and the P2 DCI format(s), the P1 and P2 being positive integers respectively.

In one embodiment, the present disclosure has the following advantages over conventional schemes:

multiple TRPs with non-ideal backhauls in a same serving cell to dynamically schedule a same UE is supported, furthermore, multiple TRPs can use a same DCI format to schedule the same UE;

a UE can transmit uplink feedback for multiple TRPs with non-ideal backhauls on a physical-layer channel, which improves coding gains and transmission efficiency.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
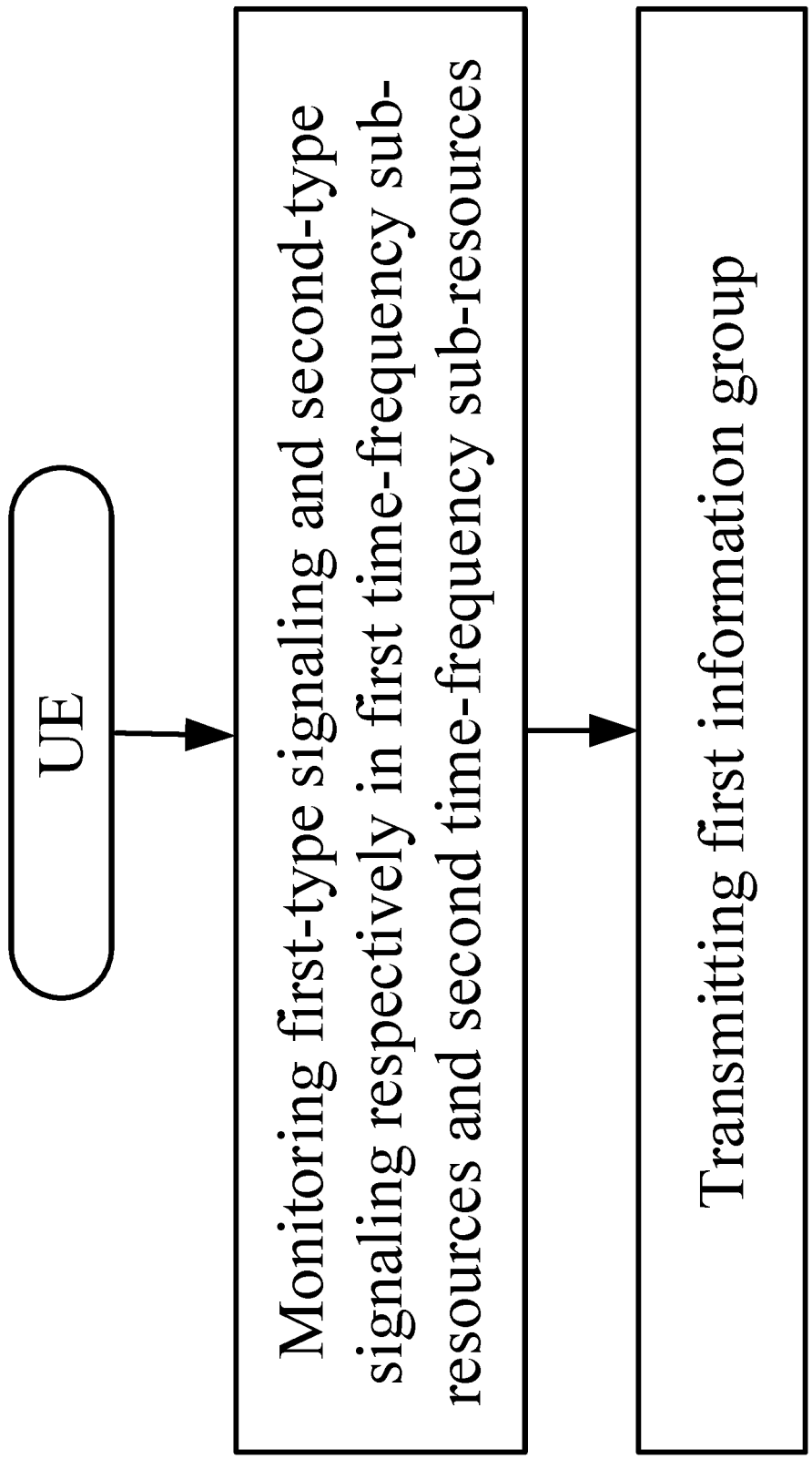
FIG. 1 illustrates a processing flowchart of a UE side according to one embodiment of the present disclosure.

Embodiment 1 illustrates a processing flowchart of a UE side, as shown in FIG. 1.

In Embodiment 1, the UE first monitors a first-type signaling and a second-type signaling in first time-frequency sub-resources and second time-frequency sub-resources respectively, and receives a first signaling in first time-frequency sub-resources, the first signaling being a first-type signaling; then transmits a first information group;

In Embodiment 1, the first-type signaling is a physical-layer signaling for downlink grant or a physical layer signaling for a SPS Release, and the second-type signaling is a physical layer signaling for downlink grant or a physical layer signaling for a SPS Release; a transmitter of the first-type signaling and a transmitter of the second-type signaling are a same serving cell; the first information group is used for indicating whether scheduling of the first signaling is correctly received; the first signaling comprises a first field, a value of the first field in the first signaling is related to a number of the first-type signaling(s) transmitted in the first time-frequency sub-resources, and the value of the first field in the first signaling is independent of a number of the second-type signaling(s) transmitted in the second time-frequency sub-resources; the second time-frequency sub-resources comprises a first time, the first time being between a first reference time and a second reference time; the first reference time and the second reference time are respectively a start time and an end time of the first time-frequency sub-resources.

In one embodiment, monitoring a first-type signaling and a second-type signaling in first time-frequency sub-resources and second time-frequency sub-resources respectively comprises: the UE determines whether the first-type signaling is transmitted in the first time-frequency sub-resources according to a Cyclic Redundancy Check (CRC) detection, and the UE determines whether the second-type signaling is transmitted in the second time-frequency sub-resources according to the CRC detection.

In one embodiment, monitoring a first-type signaling and a second-type signaling in first time-frequency sub-resources and second time-frequency sub-resources respectively comprises: a UE performs a blind decoding in the first time-frequency sub-resources to determine whether the base station transmits the first-type signaling, and the UE performs a blind detection in the second time-frequency sub-resources to determine whether the base station transmits the second-type signaling.

In one embodiment, one Search Space is allocated to the UE, and the first time-frequency sub-resources and the second time-frequency sub-resources are occupied by the one Search Space.

In one embodiment, one Control Resource Set (CORESET) is allocated to the UE, and the first time-frequency sub-resources and the second time-frequency sub-resources are occupied by the one CORESET.

In one embodiment, the first-type signaling may be any DCI format among P1 DCI format(s), and the second-type signaling may be any DCI format among P2 DCI format(s); at least one common DCI format is comprised in the P1 DCI format(s) and the P2 DCI format(s), the P1 and P2 being positive integers respectively.

In one embodiment, the one type of common DCI format is DCI format 1_0 in NR.

In one embodiment, the one type of common DCI format is DCI format 1_1 in NR.

In one embodiment, the one type of common DCI format is DCI format 1A in Long Term Evolution (LTE).

In one embodiment, the one type of common DCI format is DCI format 2C in LTE.

In one embodiment, the UE receives the second signaling in the second time-frequency sub-resources, the second signaling being a second-type signaling.

In one embodiment, a number of the first-type signaling transmitted in the first time-frequency sub-resources is 0 or 1.

In one embodiment, a number of the second-type signaling transmitted in the second time-frequency sub-resources is 0 or 1.

In one embodiment, the first-type signaling and the second-type signaling both comprise the first field.

In one embodiment, the first field is a DAI field.

In one embodiment, the first field consists of 4 bits.

In one embodiment, the first field consists of 3 bits.

In one embodiment, the first field consists of 2 bits.

In one embodiment, there exists a target Resource Element (RE) belonging to the first time-frequency sub-resources and the second time-frequency sub-resources simultaneously; the target RE occupies a multi-carrier symbol in time domain and a sub-carrier in frequency domain.

In one embodiment, the first time-frequency sub-resources and the second time-frequency sub-resources comprise multiple REs respectively.

In one embodiment, both the first time-frequency sub-resources and the second time-frequency sub-resources are reserved for a PDCCH.

In one embodiment, both the first time-frequency sub-resources and the second time-frequency sub-resources are reserved for DCI.

In one embodiment, the multi-carrier symbol is an Orthogonal Frequency Division Multiplexing (OFDM) symbol.

In one embodiment, the multi-carrier symbol is a Single Carrier Frequency Division Multiplexing Access (SC-FDMA) symbol.

In one embodiment, the multi-carrier symbol is a Filter Bank Multi-Carrier (FBMC) symbol. In one embodiment, the first time-frequency sub-resources and the second time-frequency sub-resources belong to a same carrier in frequency domain.

In one embodiment, the first time-frequency sub-resources and the second time-frequency sub-resources belong to a same slot in time domain.

In one embodiment, the first time-frequency sub-resources and the second time-frequency sub-resources respectively comprise a positive integer number of slots in time domain. At least one slot occupied by the second time-frequency sub-resources is no earlier than an earliest one occupied by the first time-frequency sub-resources and no later than a latest one occupied by the first time-frequency sub-resources.

In one embodiment, a duration of the slot is 1 millisecond.

In one embodiment, a duration of the slot does not exceed 1 millisecond.

In one embodiment, the slot comprises and only comprises 14 multi-carrier symbols.

In one embodiment, the slot comprises and only comprises 7 multi-carrier symbols.

In one embodiment, the first signaling is a physical-layer signaling used for indicating a SPS Release, and the first information group is used for indicating whether the first signaling is received correctly.

In one embodiment, the first signaling is a physical-layer signaling used for indicating a SPS Release, and the first information group is used for indicating whether a CRC bit in the first signaling is verified.

In one embodiment, the first signaling is a physical-layer signaling used for indicating a SPS Release, and the first information group is used for indicating whether the SPS scheduling is released.

In one embodiment, the value of the first field in the first signaling is used for indicating a number of the first-type signaling(s) transmitted in the first time-frequency sub-resources.

In one embodiment, the value of the first field in the first signaling is used for indicating a number of the first-type signaling(s) transmitted in a third time-frequency resource, and the first time-frequency sub-resources is a subset of the third time-frequency resource.

In one embodiment, the method in a UE used for wireless communication also comprises: receiving a second signaling in second time-frequency sub-resources, the second signaling being a second-type signaling.

Embodiment 2

Figure 2:
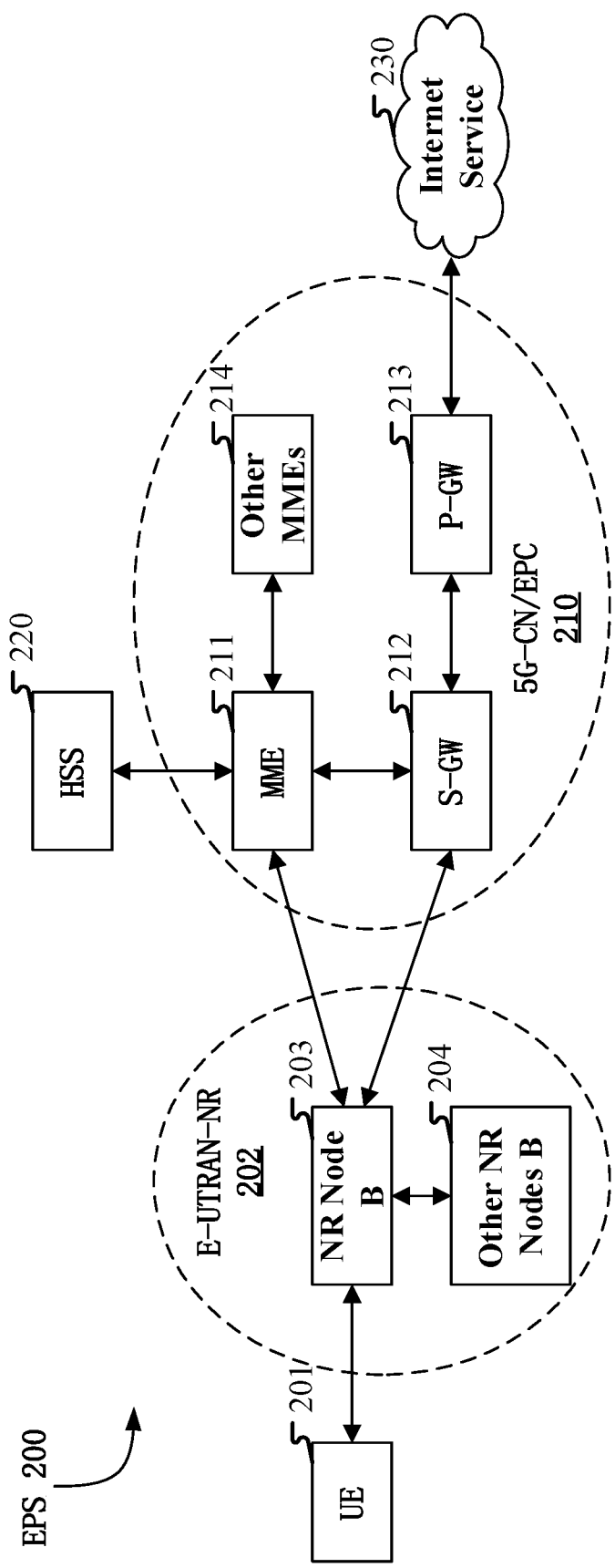
FIG. 2 illustrates a schematic diagram of a network architecture according to one embodiment of the present disclosure.

Embodiment 2 illustrates a schematic diagram of a network architecture, as shown in FIG. 2.

FIG. 2 is a diagram illustrating a network architecture 200 of Long-Term Evolution (LTE), Long-Term Evolution Advanced (LTE-A) and future 5G systems. The LTE network architecture 200 may be called an Evolved Packet System (EPS) 200. The EPS 200 may comprise one or more UEs 201, an E-UTRAN-NR 202, a 5G-Core Network/Evolved Packet Core (5G-CN/EPC) 210, a Home Subscriber Server (HSS) 220 and an Internet Service 230. Herein, UMTS refers to Universal Mobile Telecommunications System. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services. The E-UTRAN-NR 202 comprises an NR node B (gNB) 203 and other gNBs 204. The gNB 203 provides UE 201 oriented user plane and control plane protocol terminations. The gNB 203 may be connected to other gNBs 204 via an X2 interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5G-CN/EPC 210 for the UE 201. Examples of the UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, game consoles, unmanned aerial vehicles (UAV), aircrafts, narrow-band physical network devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5G-CN/EPC 210 via an S1 interface. The 5G-CN/EPC 210 comprises an MME 211, other MMES 214, a Service Gateway (S-GW) 212 and a Packet Date Network Gateway (P-GW) 213. The MME 211 is a control node for processing a signaling between the UE 201 and the 5G-CN/EPC 210. Generally, the MME 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Services (PSSs).

In one embodiment, the UE 201 corresponds to the UE in the present disclosure.

In one embodiment, the gNB 203 corresponds to the base station in the present disclosure.

In one subembodiment, the UE 201 supports HARQ.

In one subembodiment, the gNB 203 supports HARQ.

Embodiment 3

Figure 3:
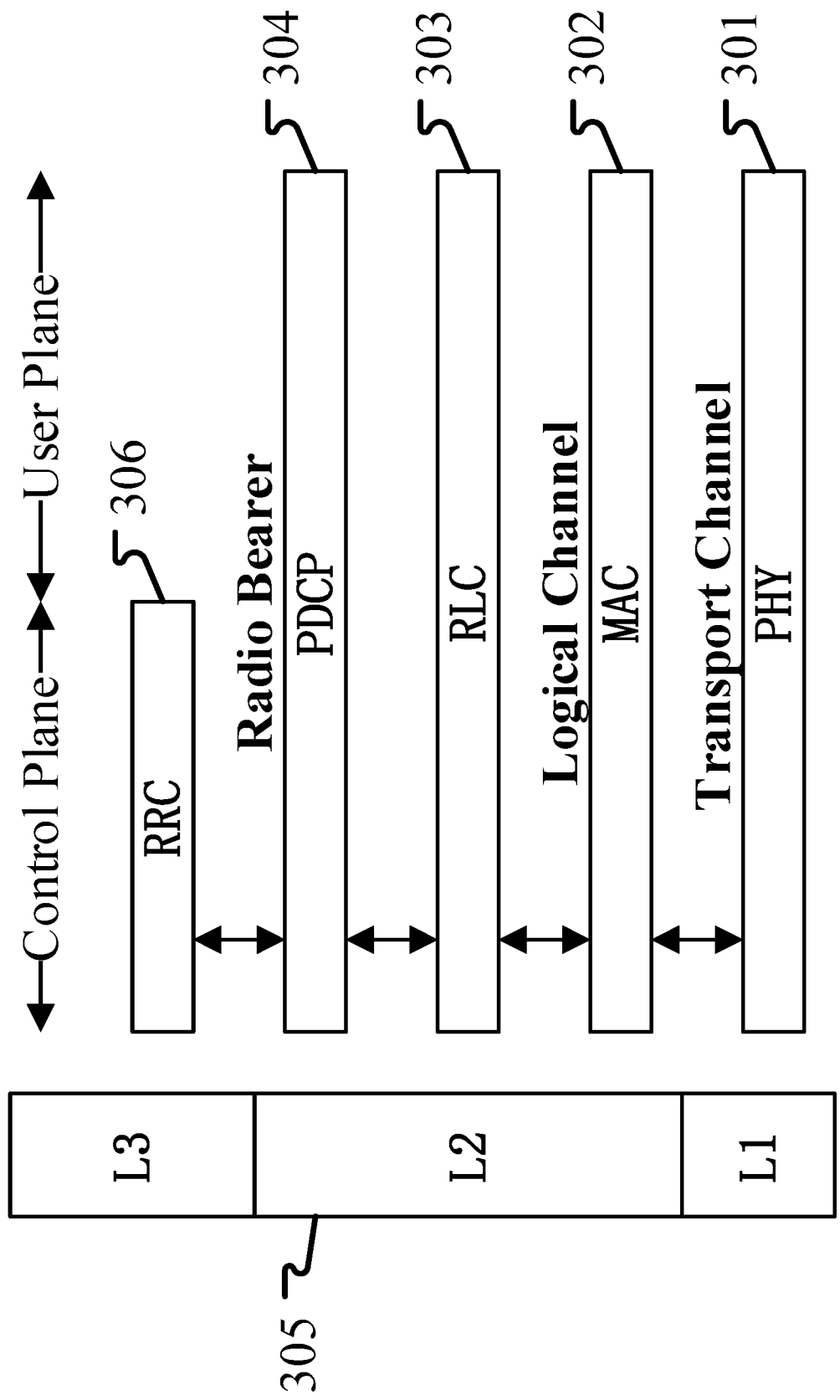
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane, as shown in FIG. 3.

FIG. 3 is a schematic diagram illustrating a radio protocol architecture of a user plane and a control plane. In FIG. 3, the radio protocol architecture for a UE and a gNB is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the UE and the gNB via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the gNBs of the network side. Although not described in FIG. 3, the UE may comprise several protocol layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between UEs various radio resources (i.e., resources block) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also comprises a Radio Resource Control (RRC) sublayer 306 in the layer 3 (L3). The RRC sublayer 306 is responsible for acquiring radio resources (i.e., radio bearer) and configuring the lower layer using an RRC signaling between the gNB and the UE.

In one embodiment, the radio protocol architecture in FIG. 3 is applicable to the UE in the present disclosure.

In one embodiment, the radio protocol architecture in FIG. 3 is applicable to the base station in the present disclosure.

In one embodiment, the physical-layer signaling in the present disclosure is generated by the PHY 301.

In one embodiment, the first-type signaling and the second-type signaling in the present disclosure are generated by the PHY 301.

In one embodiment, the first information group in the present disclosure is generated by the PHY 301.

In one embodiment, the first radio signal in the present disclosure is generated by the PHY 301.

In one embodiment, the P downlink information groups in the present disclosure are generated by the RRC sublayer 306.

In one embodiment, the first downlink information group in the present disclosure is generated by the RRC sublayer 306.

In one embodiment, the physical-layer channel in the present disclosure refers to a wireless channel connecting a PHY layer of the UE and a PHY layer of the base station.

In one embodiment, a transmission channel refers to a wireless channel connecting PHY 301 and MAC sublayer 302.

Embodiment 4

Figure 4:
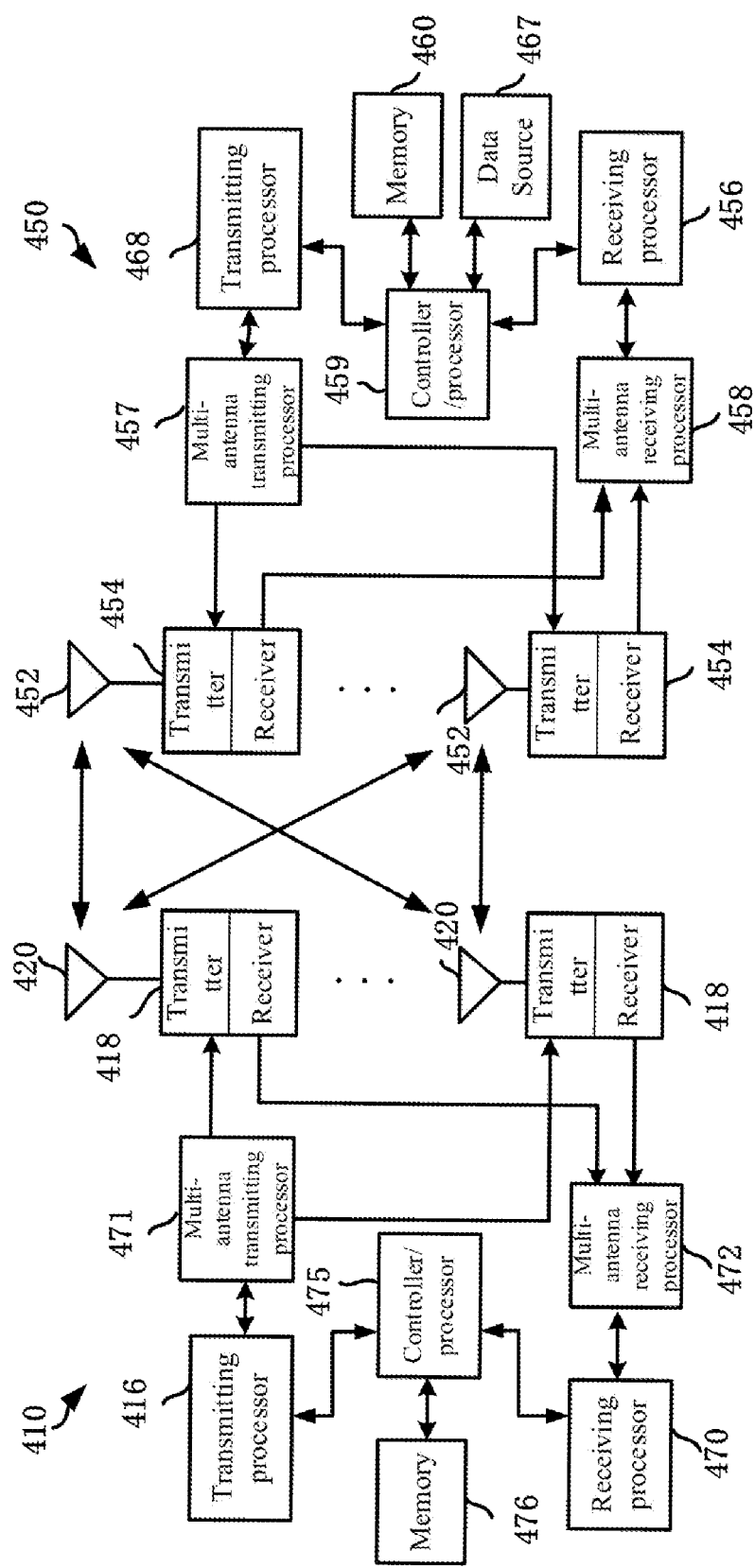
FIG. 4 illustrates a schematic diagram of a New Radio (NR) node and a UE according to one embodiment of the present disclosure.

Embodiment 4 illustrates a schematic diagram of a New Radio (NR) node and a UE, as shown in FIG. 4. FIG. 4 is a block diagram illustrating a UE 450 and a gNB 410 that are in communication with each other in access network.

The gNB 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The UE 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In downlink (DL) transmission, at the gNB 410, a higher-layer packet from a core network is provided to the controller/processor 475. The controller/processor 475 provides a function of the L2 layer. In DL transmission, the controller/processor 475 provides header compression, encryption, packet segmentation and reordering, and multiplexing between a logical channel and a transport channel, and radio resource allocation for the UE 450 based on various priorities. The controller/processor 475 is also in charge of HARQ operation, retransmission of a lost packet, and a signaling to the UE 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the UE 450 side, and the mapping to signal clusters corresponding to each modulation scheme (i.e., BPSK, QPSK, M-PSK, M-QAM, etc.). The multi-antenna transmitting processor 471 performs digital spatial precoding and beamforming processing on the encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream. Each radio frequency stream is later provided to different antennas 420.

In downlink (DL) transmission, at the UE 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any UE 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the gNB 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In downlink transmission, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing. The controller/processor 459 also performs error detection using ACK and/or NACK protocols as a way to support HARQ operation.

In uplink (UL) transmission, at the UE 450, the data source 467 is configured to provide a higher-layer packet to the controller/processor 459. The data source 467 represents all protocol layers above the L2 layer. Similar to a transmitting function of the gNB 410 described in DL transmission, the controller/processor 459 performs header compression, encryption, packet segmentation and reordering, and multiplexing between a logical channel and a transport channel based on radio resource allocation of the gNB 410 so as to provide the L2 layer functions used for the user plane and the control plane. The controller/processor 459 is also responsible for HARQ operation, retransmission of a lost packet, and a signaling to the gNB 410. The transmitting processor 468 performs modulation mapping and channel coding. The multi-antenna transmitting processor 457 implements digital multi-antenna spatial precoding and beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In uplink (UL) transmission, the function of the gNB 410 is similar to the receiving function of the UE 450 described in DL transmission. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In UL transmission, the controller/processor 475 provides de-multiplexing between a transport channel and a logical channel, packet reassembling, decryption, header decompression, control signal processing so as to recover a higher-layer packet from the UE 450. The higher-layer packet coming from the controller/processor 475 may be provided to the core network. The controller/processor 475 can also perform error detection using ACK and/or NACK protocols to support HARQ operation.

In one embodiment, the UE 450 comprises at least one processor and at least one memory, the at least one memory includes computer program codes. The at least one memory and the computer program codes are configured to be used in collaboration with the at least one processor. The UE 450 at least monitors a first-type signaling and a second-type signaling in first time-frequency sub-resources and second time-frequency sub-resources; and transmits a first information group; wherein a first signaling is received in first time-frequency sub-resources, the first signaling being a first-type signaling.

In one embodiment, the UE 450 comprises a memory that stores a computer readable instruction program. The computer readable instruction program generates an action when executed by at least one processor. The action includes monitoring a first-type signaling and a second-type signaling in first time-frequency sub-resources and second time-frequency sub-resources respectively; and transmitting a first information group; wherein a first signaling is received in the first time-frequency sub-resources, the first signaling being a first-type signaling.

In one embodiment, the UE 450 comprises at least one processor and at least one memory, the at least one memory includes computer program codes. The at least one memory and the computer program codes are configured to be used in collaboration with the at least one processor. The UE 450 at least monitors a first-type signaling and a second-type signaling in first time-frequency sub-resources and second time-frequency sub-resources; and transmits a first information group; wherein a first signaling is received in first time-frequency sub-resources, the first signaling being a first-type signaling.

In one embodiment, the UE 450 comprises a memory that stores a computer readable instruction program. The computer readable instruction program generates an action when executed by at least one processor. The action includes monitoring a first-type signaling and a second-type signaling in first time-frequency sub-resources and second time-frequency sub-resources respectively; transmitting a first information group; wherein a first signaling is received in the first time-frequency sub-resources, the first signaling being a first-type signaling.

In one embodiment, the gNB 410 comprises at least one processor and at least one memory, the at least one memory comprises computer program codes. The at least one memory and the computer program codes are configured to be used in collaboration with the at least one processor. The gNB 410 at least: transmits a first signaling in first time-frequency sub-resources, the first signaling being a first-type signaling; and receives a first information group.

In one embodiment, the gNB 410 comprises a memory that stores a computer readable instruction program. The computer readable instruction program generates an action when executed by at least one processor. The action includes: transmitting a first signaling in first time-frequency sub-resources, the first signaling being a first-type signaling; and receiving a first information group.

In one embodiment, the gNB 410 comprises at least one processor and at least one memory, the at least one memory comprises computer program codes; the at least one memory and the computer program codes are configured to be used in collaboration with the at least one processor. The gNB 410 at least: transmits a first signaling in first time-frequency sub-resources, the first signaling being a first-type signaling; and receives a first information group.

In one embodiment, the gNB 410 comprises a memory that stores a computer readable instruction program. The computer readable instruction program generates an action when executed by at least one processor. The action includes: transmitting a first signaling in first time-frequency sub-resources, the first signaling being a first-type signaling; and receiving a first information group.

In one embodiment, the UE 450 corresponds to the UE in the present disclosure.

In one embodiment, the gNB 410 corresponds to the base station in the present disclosure.

Embodiment 5

Figure 5:
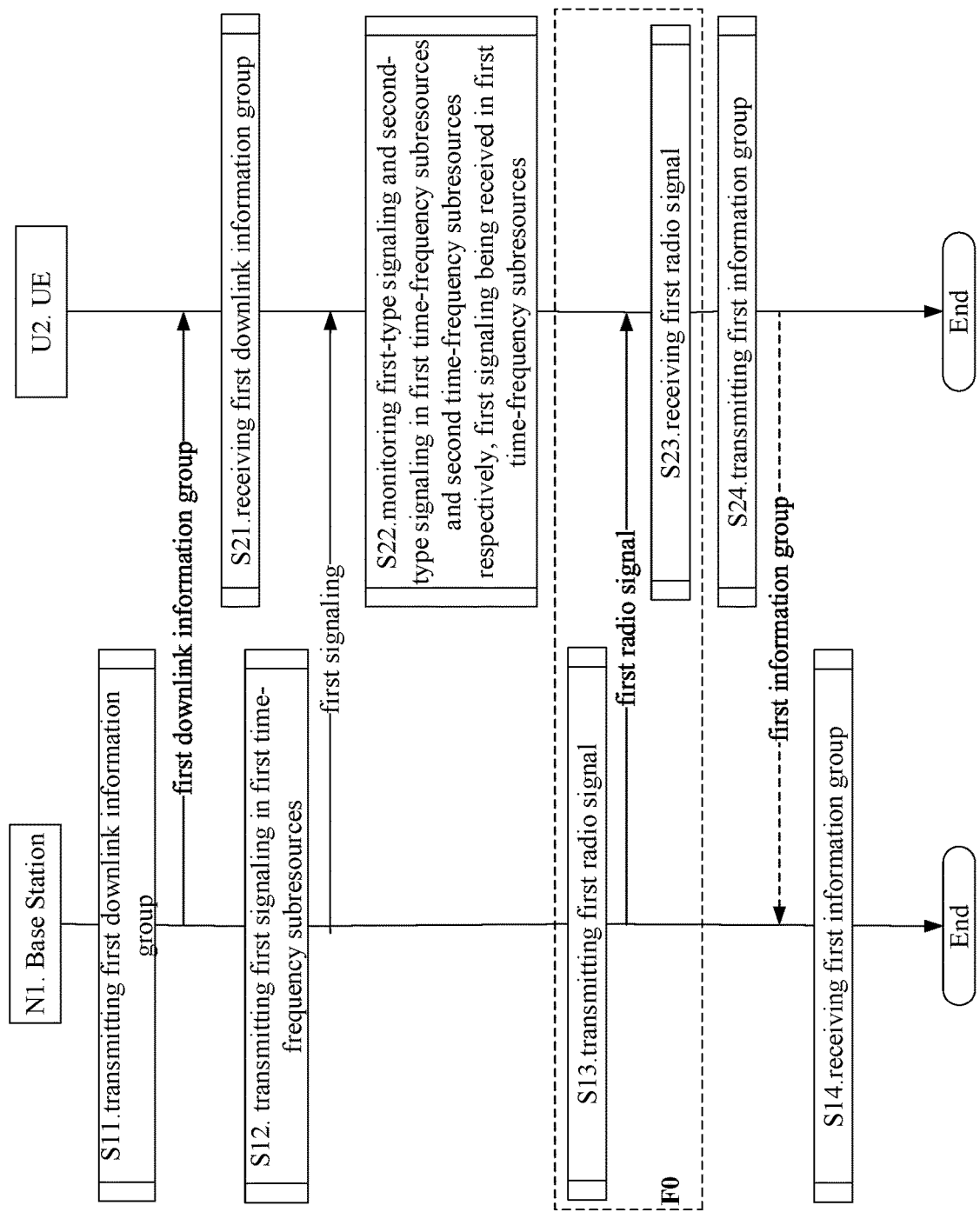
FIG. 5 illustrates a flowchart of wireless transmission according to one embodiment of the present disclosure.

Embodiment 5 illustrates a flowchart of wireless transmission, as shown in FIG. 5. In FIG. 5, a base station N1 is a maintenance base station for a serving cell of a UE U2; wherein steps in box F0 are optional.

The base station N1 transmits a first downlink information group in step S11; transmits a first signaling in first time-frequency sub-resources in step S12, the first signaling being a first-type signaling; transmits a first radio signal in step S13; and receives a first information group in step S14.

The U2 receives a first downlink information group in step S21; monitors a first-type signaling and a second-type signaling in first time-frequency sub-resources and second time-frequency resource respectively in step S12, and a first signaling is received in first time-frequency sub-resources, the first signaling being a first-type signaling; receives a first radio signal in step S13; and transmits a first information group in step S14.

In Embodiment 5, the first-type signaling is a physical layer signaling used for downlink grant or a physical-layer signaling used for a SPS Release, and the second-type signaling is a physical-layer signaling used for downlink grant or a physical-layer signaling used for a SPS Release; a transmitter of the first-type signaling and a transmitter of the second-type signaling are a same serving cell; the first information group is used for indicating whether scheduling of the first signaling is correctly received; the first signaling comprises a first field, a value of the first field in the first signaling is related to a number of the first-type signaling(s) transmitted in the first time-frequency sub-resources, and the value of the first field in the first signaling is independent of a number of the second-type signaling(s) transmitted in the second time-frequency sub-resources; the second time-frequency sub-resources comprises a first time, the first time being between a first reference time and a second reference time; the first reference time and the second reference time are respectively a start time and an end time of the first time-frequency sub-resources, wherein the first downlink information group is used for indicating a target time-frequency-resource set, the target time-frequency-resource set comprising the first time-frequency sub-resources; and the first field in the first signaling is used for determining at least one of the following:

an accumulative number of serving cell-PDCCH monitoring occasion pair(s) in which the first-type signaling is present up to a current serving cell and a current PDCCH monitoring occasion in a first time window, first in ascending order of serving cell index and then in ascending order of PDCCH monitoring occasion index;

a total number of serving cell-PDCCH monitoring occasion pair(s) in which the first-type signaling is present up to a current PDCCH monitoring occasion in the first time window.

In one embodiment, the target time-frequency-resource set comprises the second time-frequency sub-resources.

In one embodiment, the first-type signaling and the second-type signaling both comprise a target field; the target field is used for indicating a candidate signaling type corresponding to a physical-layer signaling to which it belongs out of Q2 candidate signaling types, the Q2 being a positive integer greater than 1, and the first-type signaling and the second-type signaling are one candidate signaling type among the Q2 candidate signaling types respectively.

In one embodiment, the Q2 is equal to 2, and the target field is a bit.

In one embodiment, the target field in the first-type signaling indicates out of Q2 candidate signaling types that a physical-layer signaling to which it belongs is the first-type signaling, and the target field in the second-type signaling indicates out of Q2 candidate signaling types that a physical-layer signaling to which it belongs is the second-type signaling.

In one embodiment, the Q2 is greater than 2, and the target field comprises multiple bits.

In one embodiment, the target field is the first field.

In one embodiment, the target field is a bit field other than the first field.

In one embodiment, the first field in the first signaling is the target field in the first signaling.

In one embodiment, the first time-frequency sub-resources overlap with the second time-frequency sub-resources.

In one embodiment, the first time-frequency sub-resources and the second time-frequency sub-resources consist of same REs.

In one embodiment, the target time-frequency-resource set comprises the second time-frequency sub-resources.

In one embodiment, the configuration information comprises at least one of time-frequency resources occupied, a Modulation and Coding Status (MCS), a Redundancy Version (RV) or a New Data Indicator (NDI).

In one embodiment, the first time-frequency sub-resources belong to a Physical Resource Block (PRB) Pair, and the second time-frequency sub-resources belongs to a PRB pair.

In one embodiment, the first time-frequency sub-resources completely overlap with the second time-frequency sub-resources in time domain.

In one embodiment, the first time-frequency sub-resources comprise the second time-frequency sub-resources in time domain.

Embodiment 6

Figure 6:
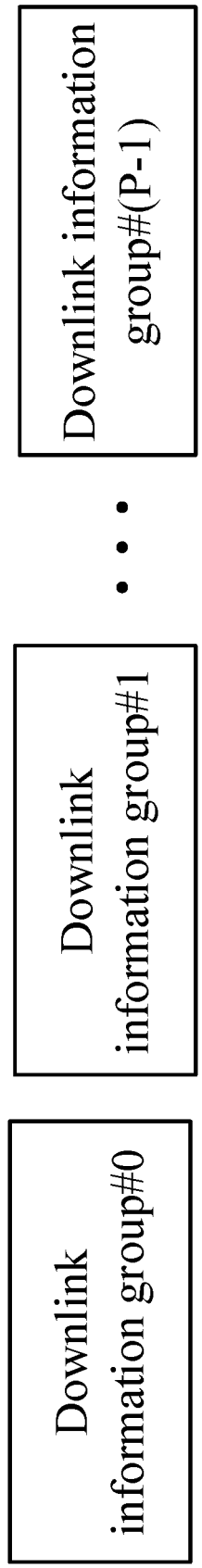
FIG. 6 illustrates a schematic diagram of P downlink information groups according to one embodiment of the present disclosure.

Embodiment 6 illustrates a schematic diagram of judging P downlink information groups, as shown in FIG. 6.

In Embodiment 6, the base station transmits P downlink information groups to the UE. Herein, the P is a positive integer greater than 1, and the P downlink information groups are respectively used for indicating P time-frequency resources, any of the P time-frequency resources being reserved for one of the first-type signaling or the second-type signaling; there exists two time-frequency resources of the P time-frequency resources being reserved for the first-type signaling and the second-type signaling respectively; the two time-frequency resources comprise the first time-frequency sub-resources and the second time-frequency sub-resources respectively.

In one embodiment, all time-frequency resources reserved for the first-type signaling in the P time-frequency resources consist of the target time-frequency resource in the present disclosure.

In one embodiment, the first downlink information group in the present disclosure is a downlink information group among P downlink information groups.

In one embodiment, the P is equal to 2.

In one embodiment, the P is greater than 2.

In one embodiment, the P downlink information groups are used for indicating P DCI format groups respectively, and any of the P DCI format groups comprises a positive integer number of DCI format(s); for any of the P downlink information groups, if correspondingly indicated time-frequency resources are reserved for the first-type signaling, a format of the first-type signaling in the correspondingly indicated time-frequency resources comprises all DCI formats in a correspondingly indicated DCI format group; if the correspondingly indicated time-frequency resources are reserved for the second-type signaling, a format of the second-type signaling in the correspondingly indicated time-frequency resource comprises all DCI formats in a correspondingly indicated DCI format group.

In one embodiment, any of the P DCI format groups only comprises one DCI format.

In one embodiment, a number of DCI formats comprised in each of the P DCI format groups are the same.

In one embodiment, a number of DCI formats comprised in at least two of the P DCI format groups are different.

In one embodiment, the first downlink information group is a downlink information group among P downlink information groups.

In one embodiment, the P downlink information groups are respectively used for indicating P antenna port groups, and any of the P antenna port groups comprises a positive integer number of antenna port(s); for any of the P downlink information groups, if correspondingly indicated time-frequency resources are reserved for the first-type signaling, a transmission antenna port of the first-type signaling in the correspondingly indicated time-frequency resources is in spatial correlation with at least one antenna port in a correspondingly indicated antenna port group; if correspondingly indicated time-frequency resources are reserved for the second-type signaling, a transmission antenna port of the second-type signaling in the correspondingly indicated time-frequency resources is in spatial correlation with at least one antenna port of a correspondingly indicated antenna port group.

In one embodiment, the spatial correlation refers to be Quasi Co-Located (QCL).

In one embodiment, if a large-scale fading gone through by one antenna port can be used for inferring a large-scale fading gone through by the other antenna port, the two antenna ports can be called that they are in spatial correlation, and the large-scale fading comprises one or more of a maximum Doppler frequency offset, a maximum multipath length, and an analog beamforming vector.

In one embodiment, the first time-frequency sub-resources and the second time-frequency sub-resources are respectively reserved for two CORESETs.

In one embodiment, the first time-frequency sub-resources and the second time-frequency sub-resources are respectively reserved for two Search Spaces.

In one embodiment, the P downlink information groups comprises a higher-layer signaling.

In one embodiment, the higher-layer signaling is a RRC layer signaling.

In one embodiment, at least one of the P downlink information groups comprises a higher-layer signaling and a physical-layer signaling.

In one subembodiment of the above embodiment, the P downlink information groups correspond to P Band Width Parts (BWP) respectively, the higher-layer signaling is used for indicating configuration information of a corresponding BWP, and the physical-layer signaling is used for dynamic BWP switching.

In one subembodiment of the above embodiment, the physical-layer signaling is DCI for DownLink Grant.

In one embodiment, for each downlink information group among the P downlink information groups, an explicit method is adopted for indicating that corresponding time-frequency resources are reserved for the first-type signaling, or an explicit method is adopted for indicating that corresponding time-frequency resources are reserved for the second-type signaling.

In one embodiment, the explicit method is to indicate whether corresponding time-frequency resources are reserved for the first-type signaling or the second-type signaling via an indicator of one bit.

In one embodiment, the explicit method is to use multiple bits to indicate the first-type signaling out of Q1 candidate signaling types, or to use multiple bits to indicate the second-type signaling out of Q1 candidate signaling types, the Q1 being a positive integer greater than 2; the first-type signaling and the second-type signaling are respectively one candidate signaling type among the Q candidate signaling types.

In one embodiment, for each downlink information group among the P downlink information groups, an implicit method is adopted for indicating that corresponding time-frequency resources are reserved for the first-type signaling, or an implicit method is adopted for indicating that corresponding time-frequency resources are reserved for the second-type signaling.

In one embodiment, the implicit method refers to: other information indicated by a downlink information group is used for inferring whether corresponding time-frequency resources are reserved for the first-type signaling or the second-type signaling.

In one embodiment, the other information comprises a Search Space type.

In one embodiment, the other information comprises the DCI format group.

In one embodiment, the other information comprises the antenna port group.

In one embodiment, if a Search Space type is Common Search Space (CSS), corresponding time-frequency resources are reserved for the first-type signaling; if a Search Space type is a UE-Specific Search Space (USS), corresponding time-frequency resources are reserved for the second-type signaling.

Embodiment 7

Figure 7:
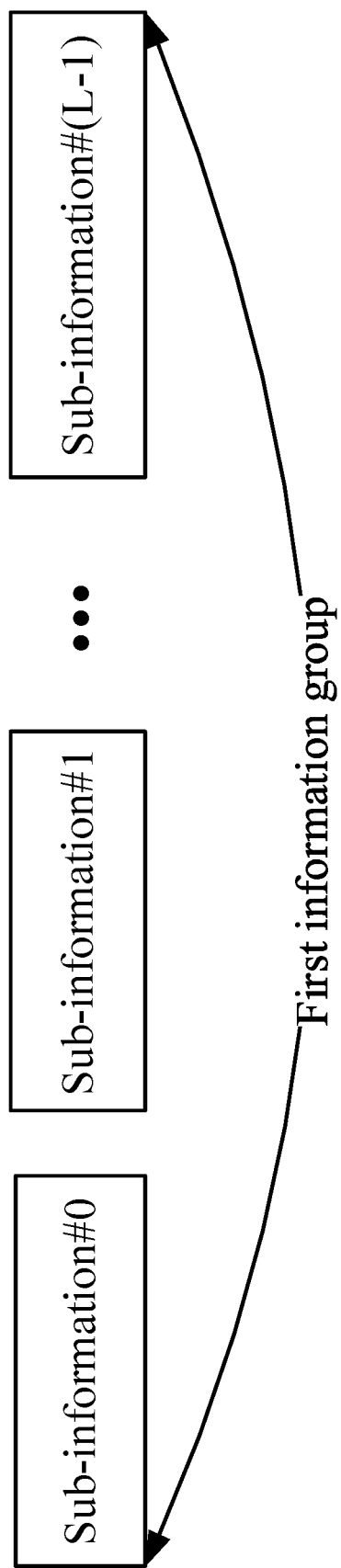
FIG. 7 illustrates a schematic diagram of a first information group according to one embodiment of the present disclosure.

Embodiment 7 illustrates a schematic diagram of a first information group, as shown in FIG. 7.

In Embodiment 7, a first information group comprises L pieces of sub-information, that is, sub-information #0, #1, . . . , #(L−1) in FIG. 7, and only one piece of sub-information among the L pieces of sub-information is used for indicating whether the scheduling of the first signaling is correctly received; first sub-information in the first signaling is used for determining the one piece of sub-information out of the L pieces of sub-information, or first sub-information in the first signaling is used for indicating the L; the first information group is transmitted on a physical-layer channel; the L is a positive integer greater than 1; at least one piece of sub-information among the L pieces of sub-information in the first information group is used for indicating whether the scheduling of the second-type signaling is correctly received.

In one embodiment, the first information is transmitted on a Physical Uplink Control CHannel (PUCCH).

In one embodiment, the first information group is transmitted on a Physical Uplink Shared CHannel (PUSCH).

In one embodiment, the L pieces of sub-information in the first information group indicates whether schedulings of L first-type signalings are correctly received respectively.

In one embodiment, there at least exist two pieces of sub-information among the L pieces of sub-information in the first information group indicating whether a scheduling of a first-type signaling is correctly received and whether a scheduling of a second-type signaling is correctly received respectively.

In one embodiment, each piece of sub-information among the L pieces of sub-information in the first information group comprises a positive integer number of bit(s).

In one embodiment, a number of bit(s) comprised in each piece of sub-information among the L pieces of sub-information in the first information group is the same.

In one embodiment, a number of bits comprised in at least two pieces of sub-information among the L pieces of sub-information in the first information group are different.

Embodiment 8

Figure 8:
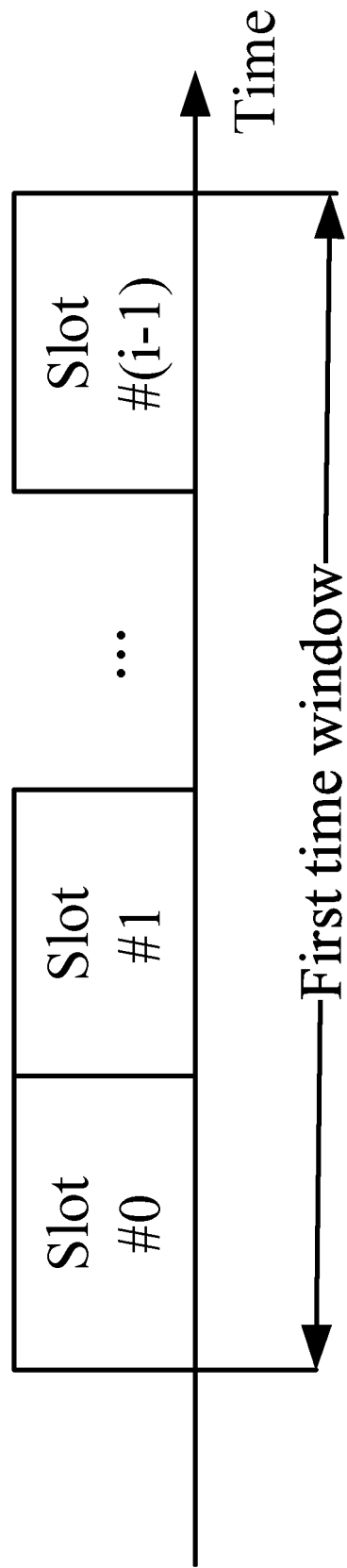
FIG. 8 illustrates a schematic diagram of a first time window according to one embodiment of the present disclosure.

Embodiment 8 illustrates a schematic diagram of a first time window, as shown in FIG. 8.

In Embodiment 8, a first time window consists of i slot(s), the i being a positive integer; the i slot(s) respectively correspond(s) to slot #0, #1, . . . , #i in FIG. 8, any of the i slot(s) comprises a positive integer number of multi-carrier symbol(s).

In one embodiment, all of the slot(s) comprise(s) an equal number (equal numbers) of multi-carrier symbol(s).

In one embodiment, a number of multi-carrier symbols comprised in at least two of the i time slots are different.

In one embodiment, the first time-frequency sub-resources in the present disclosure belong to one of the i slot(s) in time domain.

In one embodiment, the second time-frequency sub-resources in the present disclosure belong to one of the i slot(s) in time domain.

In one embodiment, the first time-frequency sub-resources in the present disclosure comprise at least two of the i slots in time domain, and the second time-frequency sub-resources belong to one of the i slot(s) in time domain; a slot to which the second time-frequency sub-resources belong is located between an earliest slot and a latest slot occupied by the first time-frequency sub-resources in time domain.

In one embodiment, an earliest slot occupied by the first time-frequency sub-resources in time domain comprises the first reference time in the present disclosure; a latest slot occupied by the first time-frequency sub-resources in time domain comprises the second reference time in the present disclosure.

In one embodiment, each of the i slot(s) comprises at least one Search Space.

In one embodiment, each of the i slot(s) comprises at least one CORESET.

In one embodiment, time-domain resources occupied by at least two of the i slots are non-consecutive.

Embodiment 9

Figure 9:
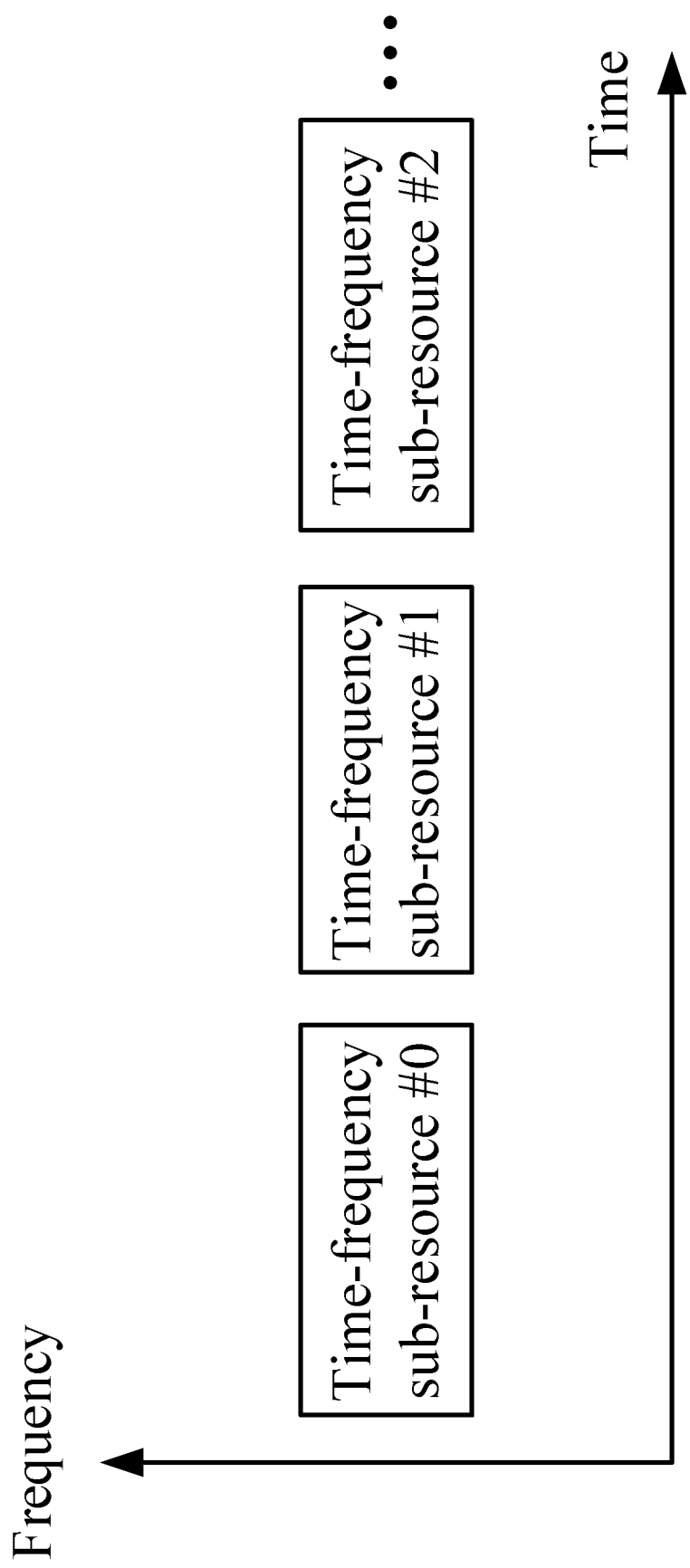
FIG. 9 illustrates a schematic diagram of time-frequency resources according to one embodiment of the present disclosure.

Embodiment 9 illustrates a schematic diagram of a time-frequency resource, as shown in FIG. 9.

In Embodiment 9, given time-frequency resources comprises a multiple time-frequency sub-resources, that is, time-frequency sub-resources #1, #2, . . . in FIG. 9.

In one embodiment, the time-frequency sub-resources #0, #1, #2, . . . appear at equal spaces in time domain, that is, any two adjacent time-frequency sub-resources among the time-frequency sub-resources #0, #1, #2, . . . are with equal time intervals.

In one embodiment, each of the time-frequency sub-resources #0, #1, #2, . . . consists of a positive integer number of consecutive multicarrier symbol(s).

In one embodiment, a number of multicarrier symbol(s) comprised in the time-frequency sub-resources #0, #1, #2, . . . is(are) the same.

In one embodiment, the first time-frequency sub-resources in the present disclosure is one of the time-frequency sub-resources #0, #1, #2, . . . , and the second time-frequency sub-resources in the present disclosure is one of the time-frequency sub-resources #0, #1, #2, . . . .

In one embodiment, the first time-frequency sub-resources in the present disclosure and the second time-frequency sub-resources in the present disclosure are a same one among the time-frequency sub-resources #0, #1, #2, . . . .

In one embodiment, the given time-frequency resource is any of the P time-frequency resources in the present disclosure.

In one embodiment, the given time-frequency resource is the target time-frequency-resource set in the present disclosure.

Embodiment 10

Figure 10:
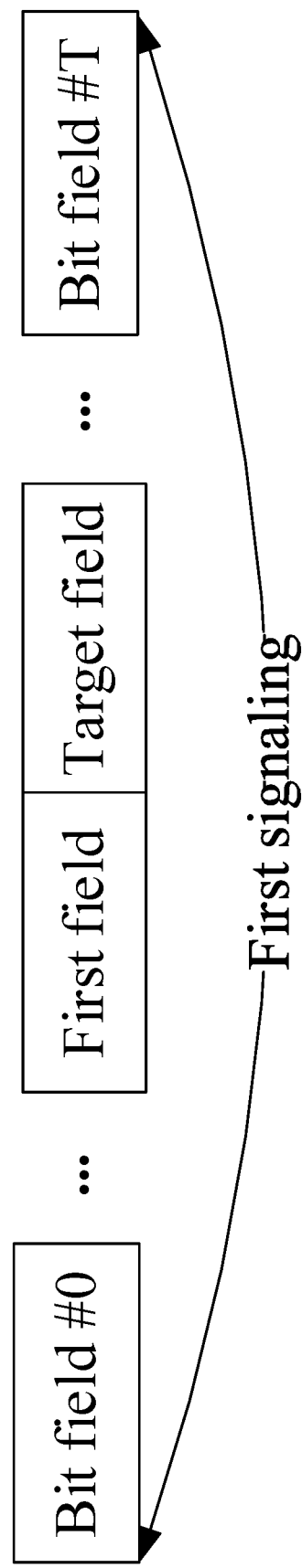
FIG. 10 illustrates a schematic diagram of a first signaling according to one embodiment of the present disclosure.

Embodiment 10 illustrates a schematic diagram of a first signaling, as shown in FIG. 10.

In Embodiment 10, a first signaling comprises T+1 bit fields; the T+1 bit fields are respectively bit field #1, bit field #2, . . . , and bit field # T; each of the T+1 bit fields comprises a positive integer number of bit(s); two of the T+1 bit fields are respectively a first field and a target field.

In one embodiment, the target field comprises 1 bit, and the target field is used for indicating a candidate signaling type corresponding to a physical-layer signaling to which it belongs out of Q2 candidate signaling types.

In one embodiment, an accumulative number of serving cell-PDCCH monitoring occasion pair(s) in which the first-type signaling is present up to a current serving cell and a current PDCCH monitoring occasion in a first time window is X1, first in ascending order of serving cell index and then in ascending order of PDCCH monitoring occasion index; the first field comprises 2 bits, and a value of the first field in the first signaling is equal to a remainder obtained by dividing the X1 by 4.

In one embodiment, an accumulative number of serving cell-PDCCH monitoring occasion pair(s) in which the first-type signaling is present up to a current serving cell and a current PDCCH monitoring occasion in a first time window is X1, first in ascending order of serving cell index and then in ascending order of PDCCH monitoring occasion index; an accumulative number of serving cell-PDCCH monitoring occasion pair(s) in which the first-type signaling is present up to a current serving cell and a current PDCCH monitoring occasion in a first time window is X2, first in ascending order of serving cell index and then in ascending order of PDCCH monitoring occasion index; the first field comprises 4 bits, among which values of 2 bits are equal to a remainder of dividing the X1 by 4, and values of the other 2 bits are equal to a remainder of dividing the X2 by 4.

In one embodiment, the Q2 is equal to 2, and the target field is a bit.

In one embodiment, the target field of the first-type signaling indicates from Q2 candidate signaling types that a physical-layer signaling to which it belongs is the first-type signaling, and the target field of the second-type signaling indicates from Q2 candidate signaling types that a physical-layer signaling to which it belongs is the second-type signaling.

In one embodiment, the Q2 is greater than 2, and the target field comprises multiple bits.

In one embodiment, the target field is the first field.

In one embodiment, the target field is a bit field other than the first field.

In one embodiment, the first field in the first signaling is the target field in the first signaling.

In one embodiment, the first field is a DAI field.

In one embodiment, the first time-frequency sub-resources overlap with the second time-frequency sub-resources.

In one embodiment, the first time-frequency sub-resources and the second time-frequency sub-resources consist of same REs.

In one embodiment, the target time-frequency-resource set comprises the second time-frequency sub-resources.

Embodiment 11

Figure 11:
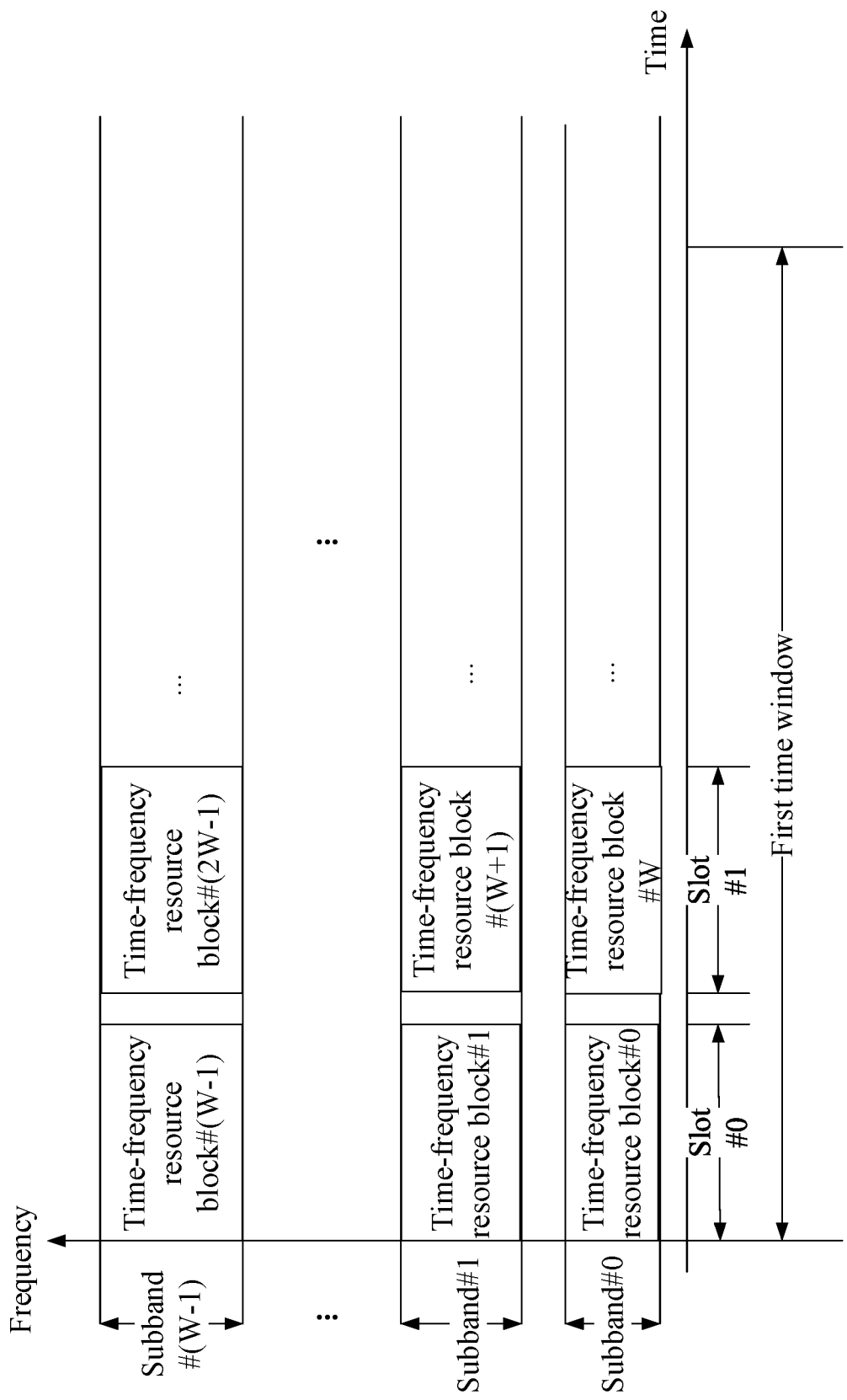
FIG. 11 illustrates a schematic diagram of using a first field to count according to one embodiment of the present disclosure.

Embodiment 11 illustrates a schematic diagram of using a first field for counting, as shown in FIG. 11.

In Embodiment 11, a UE is configured with W sub-band(s), as shown in the sub-band #0, #1, # (W−1) in FIG. 11; the one UE is configured with time-frequency-resource block #0, #1, . . . , #(W−1) in slot #0, and configured with time-frequency-resource block #W, #W+1, #(2 W−1) in slot #1; and the slot #0 and the slot #1 belong to a first time window.

In one embodiment, the slot #0 and the slot #1 are two adjacent PDCCH occasions.

In one embodiment, there exists a search space allocated to the one UE in each time-frequency-resource block among time-frequency-resource block #0, #1, . . . , #(W−1), #W, #W+1, #(2 W−1).

In one embodiment, there exists a CORESET allocated to the one UE in each time-frequency-resource block among time-frequency-resource block #0, #1, . . . , #(W−1), #W, #W+1, #(2 W−1).

In one embodiment, the W sub-band(s) is(are) W Band Width Part(s)(BWP) respectively.

In one embodiment, the W sub-band(s) is(are) W carrier(s) respectively.

In one embodiment, the W sub-band(s) belong(s) to W serving cell(s) respectively, and the W serving cell(s) is(are) maintained by a same base station.

In one embodiment, the W sub-band(s) belong(s) to W serving cell(s) respectively, the slot #0 and the slot #1 are two adjacent PDCCH occasions; time-frequency-resource block to which the first signaling belongs in the present disclosure is time-frequency-resource block #(W+1); according to first in ascending order of serving cell index and then in ascending order of PDCCH monitoring occasion index (that is, according to order of time-frequency-resource block #0, #1, . . . , #(W−1), #W, #(W+1), . . . , #(2 W−1)), an accumulative number of time-frequency-resource blocks in which the first-type signaling is present up to time-frequency-resource block #(W+1) on the W sub-band(s) in a first time window is X1; and a value of a first field in the first signaling is equal to a remainder of dividing the X1 by 4.

In one embodiment, the W sub-band(s) belong(s) to W serving cell(s) respectively, and the slot #0 and the slot #1 are two adjacent PDCCH occasions; a time-frequency-resource block to which the first signaling in the present disclosure belongs is time-frequency-resource block #W; a total number of serving cell-PDCCH monitoring occasion pair(s) in which the first-type signaling is present up to a current PDCCH monitoring occasion in the first time window is X2, that is, a sum of time-frequency resource-blocks in which the first-type signaling is present among time-frequency resource-block #0, #1, . . . , #(W−1), #W, #(W+1), #(2 W−1) is X2, and a value of a first field in the first signaling is equal to a remainder of dividing the X2 by 4.

Embodiment 12

Figure 12:
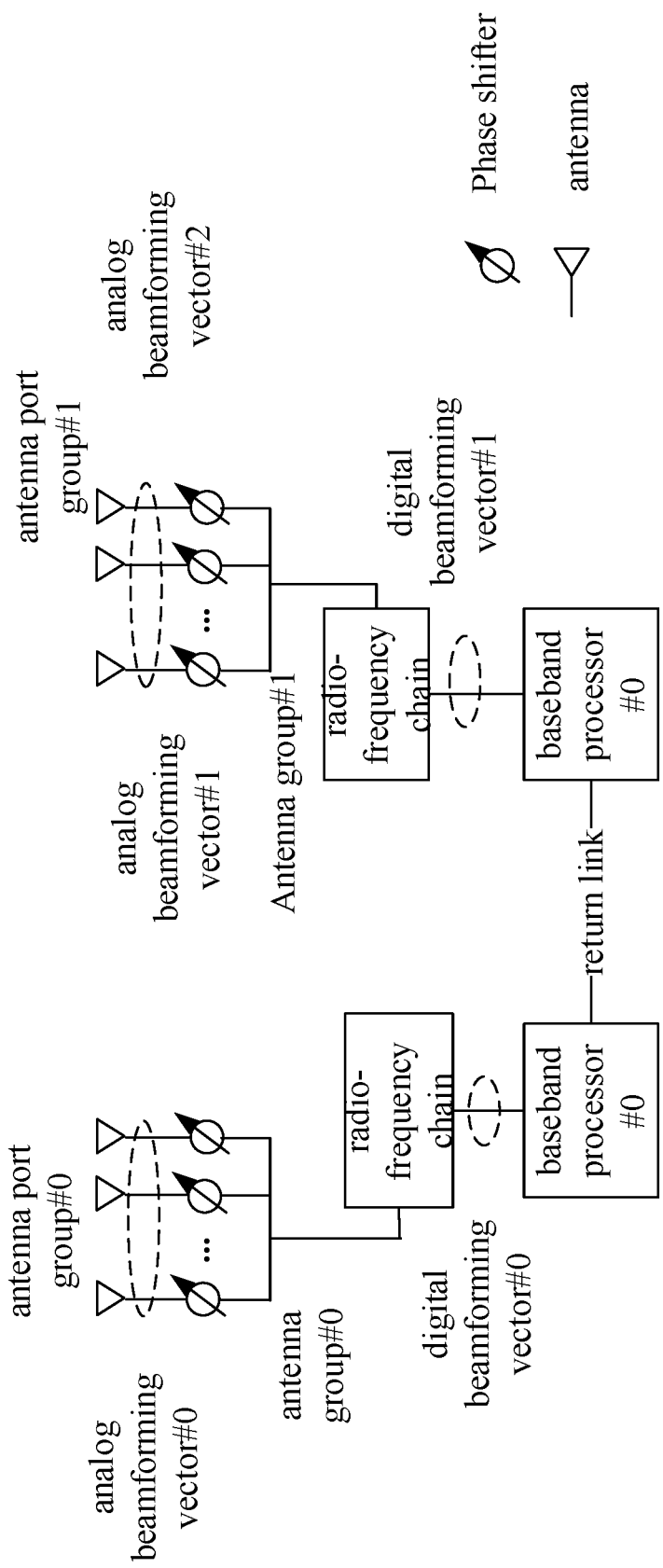
FIG. 12 illustrates a schematic diagram of a base station with a non-ideal backhaul according to one embodiment of the present disclosure.

Embodiment 12 illustrates a schematic diagram of a base station with a non-ideal backhaul, as shown in FIG. 12.

In Embodiment 12, an antenna port group comprises a positive integer number of antenna port(s); an antenna port is formed by superposition of antennas in a positive integer number of antenna group(s) through antenna virtualization; an antenna group comprises a positive integer number of antenna(s). An antenna group is connected to a baseband processor via a Radio Frequency (RF) chain, and different antenna groups correspond to different RF chains. Mapping coefficients from all antennas of a positive integer number of antenna group(s) comprised in a given antenna port to the given antenna port constitute a beamforming vector corresponding to the given antenna port. Mapping coefficients from multiple antennas comprised in any given antenna group within a positive integer number of antenna group(s) comprised in the given antenna port to the given antenna port constitute an analog beamforming vector of the given antenna group. Analog beamforming vectors corresponding to the positive integer number of antenna group(s) are arranged diagonally to form an analog beamforming matrix corresponding to the given antenna port. Mapping coefficients from the positive integer number of antenna group(s) to the given antenna port constitute a digital beamforming vector corresponding to the given antenna port. A beamforming vector corresponding to the given antenna port is acquired as a product of the analog beamforming matrix and the digital beamforming vector corresponding to the given antenna port. Different antenna ports in an antenna port group are composed of a same antenna group, and different antenna ports in a same antenna port group correspond to different beamforming vectors.

FIG. 12 illustrates two antenna port groups, namely, antenna port group #0 and antenna port group #1. Antenna port group #0 and antenna port group #1 are connected to baseband processor #0 and baseband processor #1 respectively; an interface between baseband processor #0 and baseband processor #1 is non-ideal, that is, a transmission delay cannot be ignored. Herein, the antenna port group #0 consists of antenna group #0, and the antenna port group #1 consists of antenna group #1 and antenna group #2. Mapping coefficients from multiple antennas of the antenna group #0 to the antenna port group #0 constitute an analog beamforming vector #0; and mapping coefficients from the antenna group #0 to the antenna port group #0 constitute a digital beamforming vector #0; mapping coefficients of multiple antennas in the antenna group #1 to the antenna port group #1 form an analog beamforming vector #1, mapping coefficients of the antenna group #1 to the antenna port group #1 form a digital beamforming vector #1. A beamforming vector corresponding to any antenna port of the antenna port group #0 is acquired as a product of the analog beamforming vector #0 and the digital beamforming vector #0. A beamforming vector corresponding to any antenna port of the antenna port group #1 is acquired as a product of an analog beamforming matrix formed by the analog beamforming vector #1 and the analog beamforming vector #2 arranged diagonally and the digital beamforming vector #1.

Embodiment 13

Figure 13:
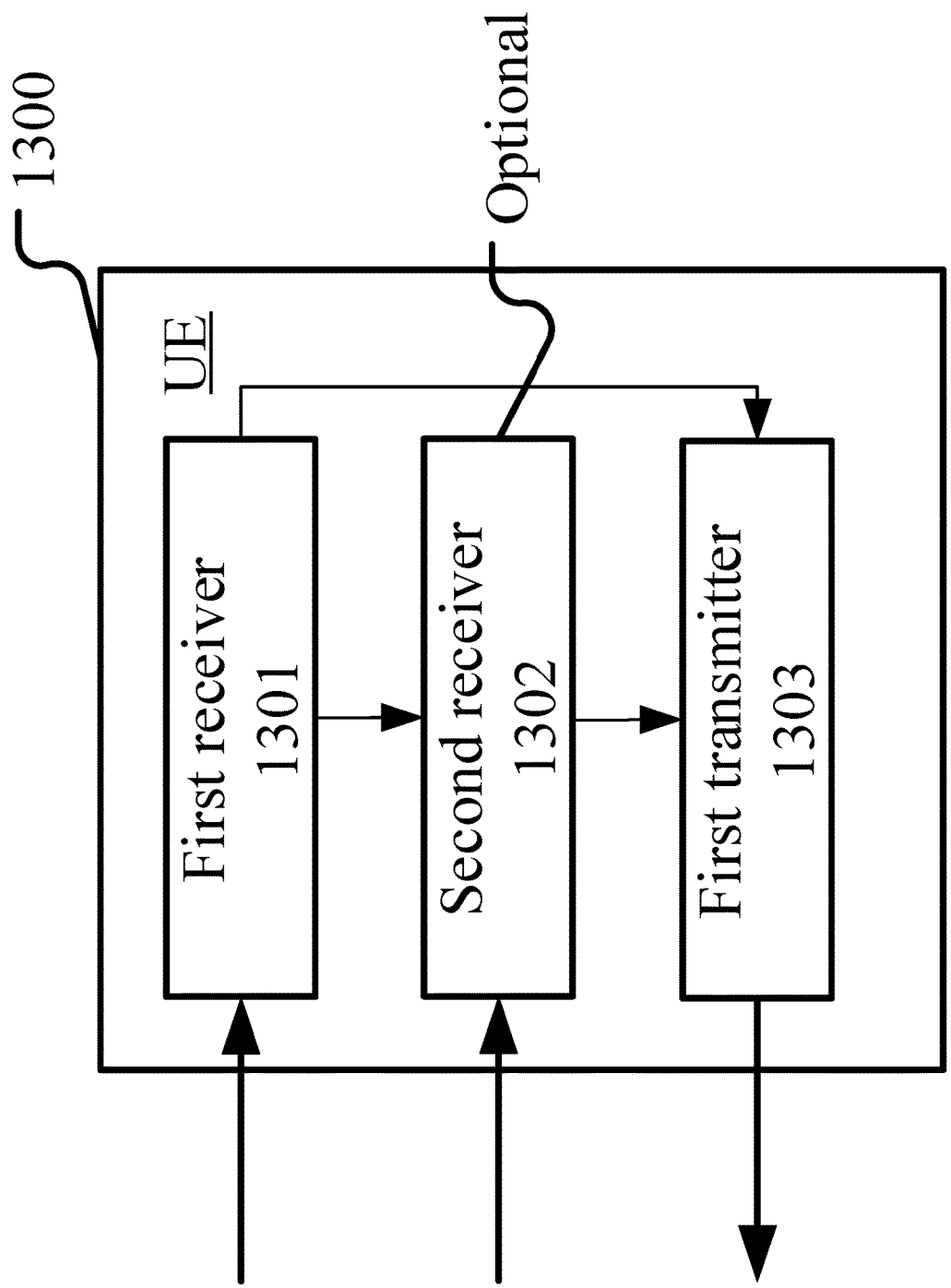
FIG. 13 illustrates a structure block diagram of a processing device in a UE according to one embodiment of the present disclosure.

Embodiment 13 is a structure block diagram illustrating a processing device in a UE, as shown in FIG. 13. In Embodiment 13, the UE 1300 comprises a first receiver 1301, a second receiver 1302 and a first transmitter 1303, herein, the second receiver 1302 is optional.

The first receiver 1301 monitors a first-type signaling and a second-type signaling respectively in first time-frequency sub-resources and second time-frequency resource in step S12, a first signaling being received in first time-frequency sub-resources, the first signaling being a first-type signaling; the first transmitter 1303 transmits a first information group.

In Embodiment 13, the first-type signaling is a physical-layer signaling for downlink grant or a physical-layer signaling for a SPS Release, and the second-type signaling is a physical layer signaling for downlink grant or a physical-layer signaling for a SPS Release; a transmitter of the first-type signaling and a transmitter of the second-type signaling are a same serving cell; the first information group is used for indicating whether scheduling of the first signaling is correctly received; the first signaling comprises a first field, a value of the first field in the first signaling is related to a number of the first-type signaling(s) transmitted in the first time-frequency sub-resources, and the value of the first field in the first signaling is independent of a number of the second-type signaling(s) transmitted in the second time-frequency sub-resources; the second time-frequency sub-resources comprise a first time, the first time being between a first reference time and a second reference time; the first reference time and the second reference time are a start time and an end time of the first time-frequency sub-resources respectively.

In one embodiment, the second receiver 1302 performs at least one of the following:

receiving a first radio signal, the first signaling comprising configuration information of the first radio signal, a first bit block being used for generating the first radio signal, the first information group being used for indicating whether the first bit block is correctly received; or, performing a SPS Release, the first information group being used for indicating that the first signaling is correctly received;

receiving a first downlink information group; wherein the first downlink information group is used for indicating a target time-frequency-resource set, the target time-frequency-resource set comprising the first time-frequency sub-resources; and the first field in the first signaling is used for determining at least one of the following:

an accumulative number of serving cell-PDCCH monitoring occasion pair(s) in which the first-type signaling is present up to a current serving cell and a current PDCCH monitoring occasion in a first time window is X1, first in ascending order of serving cell index and then in ascending order of PDCCH monitoring occasion index;

a total number of serving cell-PDCCH monitoring occasion pair(s) in which the first-type signaling is present up to a current PDCCH monitoring occasion in the first time window.

receiving P downlink information groups, P being a positive integer greater than 1; wherein the P downlink information groups are used for indicating P time-frequency resources respectively, any of the P time-frequency resources being reserved for one of the first-type signaling or the second-type signaling; there exists two time-frequency resources of the P time-frequency resources being reserved for the first-type signaling and the second-type signaling respectively; the two time-frequency resources respectively comprise the first time-frequency sub-resources and the second time-frequency sub-resources.

In one embodiment, the first receiver 1301 comprises the antenna 452 and the receiver 454 in FIG. 4.

In one embodiment, the first receiver 1301 comprises the multi-antenna receiving processor 458 and the receiving processor 456 in FIG. 4.

In one embodiment, the second receiver 1302 comprises the antenna 452 and the receiver 454 in FIG. 4.

In one embodiment, the second receiver 1302 comprises the multi-antenna receiving processor 458 and the receiving processor 456 in FIG. 4.

In one embodiment, the second receiver 1302 comprises the memory 460 in FIG. 4.

In one embodiment, the second receiver 1302 comprises the controller/processor 459 in FIG. 4.

In one embodiment, the first transmitter 1303 comprises the antenna 452 and the transmitter 454 in FIG. 4.

In one embodiment, the first transmitter 1303 comprises the multi-antenna transmitting processor 457 and the transmitting processor 468 in FIG. 4.

In one embodiment, the first transmitter 1303 comprises the data source 467 in FIG. 4.

In one embodiment, the first transmitter 1303 comprises the controller/processor 459 in FIG. 4.

Embodiment 14

Figure 14:
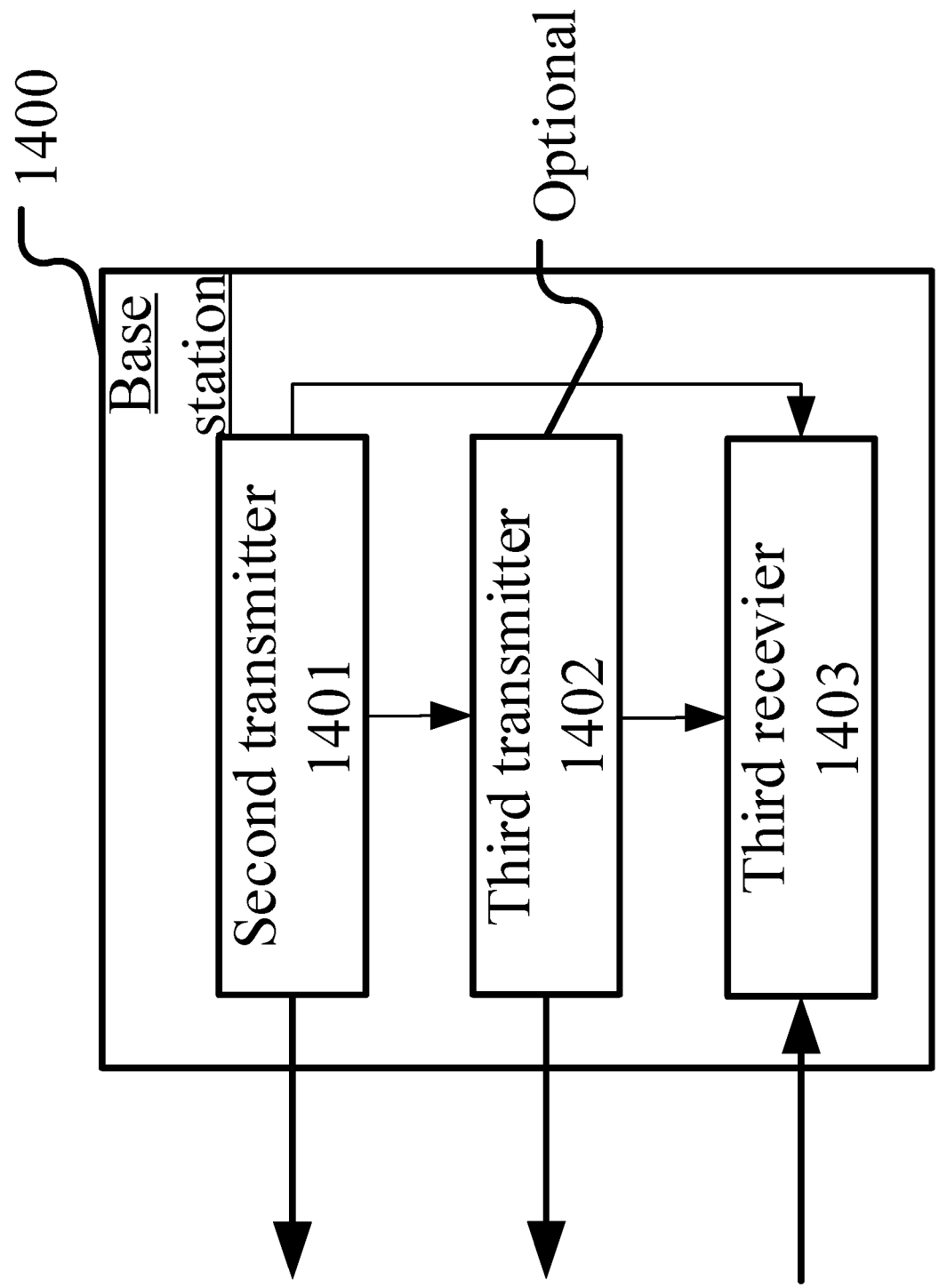
FIG. 14 illustrates a structure block diagram of a processing device in a base station according to one embodiment of the present disclosure.

Embodiment 14 illustrates a structure block diagram of a processing device in a base station, as shown in FIG. 14. In Embodiment 14, the base station 1400 comprises a second transmitter 1401, a third transmitter 1402 and a third receiver 1403, herein, the third transmitter 1402 is optional.

the second transmitter 1401 transmits a first signaling in first time-frequency sub-resources, the first signaling being a first-type signaling; the third receiver 1403 receives a first information group;

in Embodiment 14, first time-frequency sub-resources and second time-frequency sub-resources are reserved for a first-type signaling and a second-type signaling respectively; the first-type signaling is a physical-layer signaling for downlink grant or a physical-layer signaling for a SPS Release, and the second-type signaling is a physical layer signaling for downlink grant or a physical-layer signaling for a SPS Release; a transmitter of the first-type signaling and a transmitter of the second-type signaling are a same serving cell; the first information group is used for indicating whether scheduling of the first signaling is correctly received; the first signaling comprises a first field, a value of the first field in the first signaling is related to a number of the first-type signaling(s) transmitted in the first time-frequency sub-resources, and the value of the first field in the first signaling is independent of a number of the second-type signaling(s) transmitted in the second time-frequency sub-resources; the second time-frequency sub-resources comprises a first time, the first time being between a first reference time and a second reference time; the first reference time and the second reference time are respectively a start time and an end time of the first time-frequency sub-resources.

In one embodiment, the third transmitter 1402 performs at least one of the following:

transmitting a first radio signal, the first signaling comprising configuration information of the first radio signal, a first bit block being used for generating the first radio signal, the first information group being used for indicating whether the first bit block is correctly received; or, performing a SPS Release, the first information group being used for indicating that the first signaling is correctly received;

transmitting a first downlink information group; wherein the first downlink information group is used for indicating a target time-frequency-resource set, the target time-frequency-resource set comprising the first time-frequency sub-resources; and the first field in the first signaling is used for determining at least one of the following:

an accumulative number of serving cell-PDCCH monitoring occasion pair(s) in which the first-type signaling is present up to a current serving cell and a current PDCCH monitoring occasion in a first time window is X1, first in ascending order of serving cell index and then in ascending order of PDCCH monitoring occasion index;

a total number of serving cell-PDCCH monitoring occasion pair(s) in which the first-type signaling is present up to a current PDCCH monitoring occasion in the first time window.

transmitting P downlink information groups, the P being a positive integer greater than 1; wherein the P downlink information groups are used for indicating P time-frequency resources respectively, any of the P time-frequency resources being reserved for one of the first-type signaling or the second-type signaling; there exists two time-frequency resources of the P time-frequency resources being reserved for the first-type signaling and the second-type signaling respectively; the two time-frequency resources respectively comprise the first time-frequency sub-resources and the second time-frequency sub-resources.

In one embodiment, the second transmitter 1401 comprises the antenna 420 and the transmitter 418 in FIG. 4.

In one embodiment, the second transmitter 1401 comprises the multi-antenna transmitting processor 471 and the transmitting processor 416 in FIG. 4.

In one embodiment, the third transmitter 1402 comprises the antenna 420 and the transmitter 418 in FIG. 4.

In one embodiment, the third transmitter 1402 comprises the multi-antenna transmitting processor 471 and the transmitting processor 416 in FIG. 4.

In one embodiment, the third transmitter 1402 comprises the controller/processor 475 in FIG. 4.

In one embodiment, the third receiver 1403 comprises the antenna 420 and the receiver 418 in FIG. 4.

In one embodiment, the third receiver 1403 comprises the multi-antenna receiving processor 472 and the receiving processor in FIG. 4.

In one embodiment, the third receiver 1403 comprises the memory 476 in FIG. 4.

In one embodiment, the third receiver 1403 comprises the controller/processor 475 in FIG. 4.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, RFID terminals, NB-IOT terminals, Machine Type Communication (MTC) terminals, enhanced MTC (eMTC) terminals, data cards, low-cost mobile phones, low-cost tablet computers, etc. The base station or system device in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a User Equipment (UE) for wireless communication, comprising:

receiving P downlink information groups, P being a positive integer greater than 1;

monitoring a first-type signaling and a second-type signaling respectively in first time-frequency sub-resources and second time-frequency sub-resources; a first signaling is received in the first time-frequency sub-resources, the first signaling being a first-type signaling; and transmitting a first information group;

wherein the first-type signaling is a physical-layer signaling for downlink grant or a physical-layer signaling for a Semi-Persistent Scheduling (SPS) Release, and the second-type signaling is a physical-layer signaling for downlink grant or a physical-layer signaling for a SPS Release; a transmitter of the first-type signaling and a transmitter of the second-type signaling are a same serving cell; the first information group is used for indicating whether scheduling of the first signaling is correctly received; the first signaling comprises a first field, a value of the first field in the first signaling is related to a number of the first-type signaling(s) transmitted in the first time-frequency sub-resources, and the value of the first field in the first signaling is independent of a number of the second-type signaling(s) transmitted in the second time-frequency sub-resources; the second time-frequency sub-resources comprise a first time, the first time being between a first reference time and a second reference time; the first reference time and the second reference time are a start time and an end time of the first time-frequency sub-resources respectively; the P downlink information groups are respectively used for indicating P time-frequency resources, any of the P time-frequency resources being reserved for one of the first-type signaling or the second-type signaling; there exists two time-frequency resources of the P time-frequency resources being reserved for the first-type signaling and the second-type signaling respectively; the two time-frequency resources comprise the first time-frequency sub-resources and the second time-frequency sub-resources respectively; for each of the P downlink information groups, an explicit method is adopted to indicate that corresponding time-frequency resources are reserved for the first-type signaling, or an explicit method is adopted to indicate that corresponding time-frequency resources are reserved for the second-type signaling; the explicit method is to indicate whether corresponding time-frequency resources are reserved for the first-type signaling or the second-type signaling via an indicator of one bit.

2. The method according to claim 1, comprising at least one of the following:

receiving a first radio signal; the first signaling comprising configuration information of the first radio signal, a first bit block being used for generating the first radio signal, the first information group being used for indicating whether the first bit block is correctly received; or, performing a SPS Release, the first information group being used for indicating that the first signaling is correctly received;

receiving a first downlink information group; wherein the first downlink information group is used for indicating a target time-frequency-resource set, the target time-frequency-resource set comprising the first time-frequency sub-resources; and the first field in the first signaling is used for determining at least one of the following:

an accumulative number of serving cell-PDCCH (Physical Downlink Control CHannel) monitoring occasion pair(s) in which the first-type signaling is present up to a current serving cell and a current PDCCH monitoring occasion in a first time window, first in ascending order of serving cell index and then in ascending order of PDCCH monitoring occasion index;

a total number of serving cell-PDCCH monitoring occasion pair(s) in which the first-type signaling is present up to a current PDCCH monitoring occasion in the first time window.

3. The method according to claim 1, wherein the first-type signaling and the second-type signaling both comprise a target field, the target field being used for indicating a candidate signaling-type corresponding to a physical-layer signaling to which it belongs out of Q2 candidate signaling-types, the Q2 being a positive integer greater than 1, and the first-type signaling and the second-type signaling are respectively one candidate signaling-type among the Q2 candidate signaling-types;

or, the first-type signaling may be any of P1 DCI format(s), and the second-type signaling may be any of P2 DCI format(s); the P1 DCI format(s) and the P2 DCI format(s) comprise at least one common DCI format, the P1 and the P2 being positive integers respectively.

4. The method according to claim 1, wherein the first information group comprises L pieces of sub-information, among which only one piece of sub-information is used for indicating whether the scheduling of the first signaling is correctly received; first sub-information in the first signaling is used for determining the one piece of sub-information out of the L pieces of sub-information, or first sub-information in the first signaling is used for indicating the L; the first information group is transmitted on a physical-layer channel; the L is a positive integer greater than 1; at least one piece of the L pieces of sub-information in the first information group is used for indicating whether the scheduling of the second-type signaling is correctly received.

5. The method according to claim 1, wherein the first time-frequency sub-resources and the second time-frequency sub-resources are respectively reserved for two CORESETs; or, the first time-frequency sub-resources and the second time-frequency sub-resources are respectively reserved for two search spaces.

6. A method in a base station for wireless communication, comprising:
- transmitting P downlink-information-groups, P being a positive integer greater than 1;
- transmitting a first signaling in first time-frequency sub-resources, the first signaling being a first-type signaling; and
- receiving a first information group;
- wherein the first time-frequency sub-resources and second time-frequency sub-resources are reserved for a first-type signaling and a second-type signaling respectively; the first-type signaling is a physical-layer signaling for downlink grant or a physical-layer signaling for a SPS Release, and the second-type signaling is a physical-layer signaling for downlink grant or a physical-layer signaling for a SPS Release; a transmitter of the first-type signaling and a transmitter of the second-type signaling are a same serving cell; the first information group is used for indicating whether scheduling of the first signaling is correctly received; the first signaling comprises a first field, a value of the first field in the first signaling is related to a number of the first-type signaling(s) transmitted in the first time-frequency sub-resources, and the value of the first field in the first signaling is independent of a number of the second-type signaling(s) transmitted in the second time-frequency sub-resources; the second time-frequency sub-resources comprises a first time, the first time being between a first reference time and a second reference time; the first reference time and the second reference time are a start time and an end time of the first time-frequency sub-resources respectively; the P downlink information groups are respectively used for indicating P time-frequency resources, any of the P time-frequency resources being reserved for one of the first-type signaling or the second-type signaling; there exists two time-frequency resources of the P time-frequency resources being reserved for the first-type signaling and the second-type signaling respectively; the two time-frequency resources respectively comprise the first time-frequency sub-resources and the second time-frequency sub-resources; for each of the P downlink information groups, an explicit method is adopted to indicate that corresponding time-frequency resources are reserved for the first-type signaling, or an explicit method is adopted to indicate that corresponding time-frequency resources are reserved for the second-type signaling; the explicit method is to indicate whether corresponding time-frequency resources are reserved for the first-type signaling or the second-type signaling via an indicator of one bit.

7. The method according to claim 6, comprising at least one of the following:
- transmitting a first radio signal; the first signaling comprising configuration information of the first radio signal, a first bit block being used for generating the first radio signal, the first information group being used for indicating whether the first bit block is correctly received; or, performing a SPS Release, the first information group being used for indicating that the first signaling is correctly received;
- transmitting a first downlink information group; wherein the first downlink information group is used for indicating a target time-frequency-resource set, the target time-frequency-resource set comprising the first time-frequency sub-resources; and the first field in the first signaling is used for determining at least one of the following:
  - an accumulative number of serving cell-PDCCH monitoring occasion pair(s) in which the first-type signaling is present up to a current serving cell and a current PDCCH monitoring occasion in a first time window, first in ascending order of serving cell index and then in ascending order of PDCCH monitoring occasion index;
  - a total number of serving cell-PDCCH monitoring occasion pair(s) in which the first-type signaling is present up to a current PDCCH monitoring occasion in the first time window.

8. The method according to claim 6, wherein the first-type signaling and the second-type signaling both comprise a target field; the target field is used for indicating a candidate signaling type corresponding to a physical layer signaling to which it belongs out of Q2 candidate signaling types, the Q2 being a positive integer greater than 1, and the first-type signaling and the second-type signaling are respectively one candidate signaling type among the Q2 candidate signaling types;
or, the first-type signaling may be any of P1 DCI format(s), and the second-type signaling may be any of P2 DCI format(s); the P1 DCI format(s) and the P2 DCI format(s) comprise at least one common DCI format, the P1 and the P2 being positive integers respectively.

9. The method according to claim 6, wherein the first information group comprises L pieces of sub-information, among which only one piece of sub-information is used for indicating whether the scheduling of the first signaling is correctly received; first sub-information in the first signaling is used for determining the one piece of sub-information out of the L pieces of sub-information, or first sub-information in the first signaling is used for indicating the L; the first information group is transmitted on a physical layer channel; the L is a positive integer greater than 1; at least one piece of the L pieces of sub-information in the first information group is used for indicating whether the scheduling of the second-type signaling is correctly received.

10. The method according to claim 6, wherein the first time-frequency sub-resources and the second time-frequency sub-resources are respectively reserved for two CORESETs; or, the first time-frequency sub-resources and the second time-frequency sub-resources are respectively reserved for two search spaces.

11. A User Equipment (UE) for wireless communication, comprising:
- a second receiver, receiving P downlink information groups, P being a positive integer greater than 1;
- a first receiver, monitoring a first-type signaling and a second-type signaling respectively in first time-frequency sub-resources and second time-frequency sub-resources; a first signaling being received in the first time-frequency sub-resources, the first signaling being a first-type signaling; and
- a first transmitter, transmitting a first information group;
- wherein the first-type signaling is a physical-layer signaling for downlink grant or a physical-layer signaling for a SPS Release, and the second-type signaling is a physical-layer signaling for downlink grant or a physical-layer signaling for a SPS Release; a transmitter of the first-type signaling and a transmitter of the second-type signaling are a same serving cell; the first information group is used for indicating whether scheduling of the first signaling is correctly received; the first signaling comprises a first field, a value of the first field in the first signaling is related to a number of the first-type signaling(s) transmitted in the first time-frequency sub-resources, and the value of the first field in the first signaling is independent of a number of the second-type signaling(s) transmitted in the second time-frequency sub-resources; the second time-frequency sub-resources comprises a first time, the first time being between a first reference time and a second reference time; the first reference time and the second reference time are respectively a start time and an end time of the first time-frequency sub-resources; the P downlink information groups are respectively used for indicating P time-frequency resources, any of the P time-frequency resources being reserved for one of the first-type signaling or the second-type signaling; there exists two time-frequency resources of the P time-frequency resources being reserved for the first-type signaling and the second-type signaling respectively; the two time-frequency resources respectively comprise the first time-frequency sub-resources and the second time-frequency sub-resources; for each of the P downlink information groups, an explicit method is adopted to indicate that corresponding time-frequency resources are reserved for the first-type signaling, or an explicit method is adopted to indicate that corresponding time-frequency resources are reserved for the second-type signaling; the explicit method is to indicate whether corresponding time-frequency resources are reserved for the first-type signaling or the second-type signaling via an indicator of one bit.

12. The UE according to claim 11, wherein the second receiver performs at least one of the following:
receiving a first radio signal, the first signaling comprising configuration information of the first radio signal, a first bit block being used for generating the first radio signal, the first information group being used for indicating whether the first bit block is correctly received; or, performing a SPS Release, the first information group being used for indicating that the first signaling is correctly received;
receiving a first downlink information group; wherein the first downlink information group is used for indicating a target time-frequency-resource set, the target time-frequency-resource set comprising the first time-frequency sub-resources; and the first field in the first signaling is used for determining at least one of the following:
an accumulative number of serving cell-PDCCH monitoring occasion pair(s) in which the first-type signaling is present up to a current serving cell and a current PDCCH monitoring occasion in a first time window, first in ascending order of serving cell index and then in ascending order of PDCCH monitoring occasion index;
a total number of serving cell-PDCCH monitoring occasion pair(s) in which the first-type signaling is present up to a current PDCCH monitoring occasion in the first time window.

13. The UE according to claim 11, wherein the first-type signaling and the second-type signaling both comprise a target field, the target field being used for indicating a candidate signaling-type corresponding to a physical-layer signaling to which it belongs out of Q2 candidate signaling-types, the Q2 being a positive integer greater than 1, and the first-type signaling and the second-type signaling are one candidate signaling-type among the Q2 candidate signaling-types respectively;
or, the first-type signaling may be any DCI format among P1 DCI format(s), and the second-type signaling may be any DCI format among P2 DCI format(s); at least one common DCI format is comprised in the P1 DCI format(s) and the P2 DCI format(s), the P1 and P2 being positive integers respectively.

14. The UE according to claim 1, wherein the first information group comprises L pieces of sub-information, among which only one piece of sub-information is used for indicating whether the scheduling of the first signaling is correctly received; first sub-information in the first signaling is used for determining the one piece of sub-information out of the L pieces of sub-information, or first sub-information in the first signaling is used for indicating the L; the first information group is transmitted on a physical-layer channel; the L is a positive integer greater than 1; at least one piece of the L pieces of sub-information in the first information group is used for indicating whether the scheduling of the second-type signaling is correctly received.

15. The UE according to claim 1, wherein the first time-frequency sub-resources and the second time-frequency sub-resources are respectively reserved for two CORESETs; or, the first time-frequency sub-resources and the second time-frequency sub-resources are respectively reserved for two search spaces.

16. A base station used for wireless communication, comprising:
a third transmitter, transmitting P downlink information groups, the P being a positive integer greater than 1;
a second transmitter, transmitting a first signaling in first time-frequency sub-resources, the first signaling being a first-type signaling; and
a third receiver, receiving a first information group;
wherein the first time-frequency sub-resources and second time-frequency sub-resources are reserved for a first-type signaling and a second-type signaling respectively; the first-type signaling is a physical-layer signaling for downlink grant or a physical-layer signaling for a SPS Release, and the second-type signaling is a physical-layer signaling for downlink grant or a physical-layer signaling for a SPS Release; a transmitter of the first-type signaling and a transmitter of the second-type signaling are a same serving cell; the first information group is used for indicating whether scheduling of the first signaling is correctly received; the first signaling comprises a first field, a value of the first field in the first signaling is related to a number of the first-type signaling(s) transmitted in the first time-frequency sub-resources, and the value of the first field in the first signaling is independent of a number of the second-type signaling(s) transmitted in the second time-frequency sub-resources; the second time-frequency sub-resources comprises a first time, the first time being between a first reference time and a second reference time; the first reference time and the second reference time are a start time and an end time of the first time-frequency sub-resources respectively; the P downlink information groups are respectively used for indicating P time-frequency resources, any of the P time-frequency resources being reserved for one of the first-type signaling or the second-type signaling; there exists two time-frequency resources of the P time-frequency resources being reserved for the first-type signaling and the second-type signaling respectively;

the two time-frequency resources respectively comprise the first time-frequency sub-resources and the second time-frequency sub-resources; for each of the P downlink information groups, an explicit method is adopted to indicate that corresponding time-frequency resources are reserved for the first-type signaling, or an explicit method is adopted to indicate that corresponding time-frequency resources are reserved for the second-type signaling; the explicit method is to indicate whether corresponding time-frequency resources are reserved for the first-type signaling or the second-type signaling via an indicator of one bit.

17. The base station according to claim 16, wherein the third transmitter performs at least one of the following:
   transmitting a first radio signal, the first signaling comprising configuration information of the first radio signal, a first bit block being used for generating the first radio signal, the first information group being used for indicating whether the first bit block is correctly received; or, performing a SPS Release, the first information group being used for indicating that the first signaling is correctly received;
   transmitting a first downlink information group; wherein the first downlink information group is used for indicating a target time-frequency-resource set, the target time-frequency-resource set comprising the first time-frequency sub-resources; and the first field in the first signaling is used for determining at least one of the following:
      an accumulative number of serving cell-PDCCH monitoring occasion pair(s) in which the first-type signaling is present up to a current serving cell and a current PDCCH monitoring occasion in a first time window, first in ascending order of serving cell index and then in ascending order of PDCCH monitoring occasion index;
      a total number of serving cell-PDCCH monitoring occasion pair(s) in which the first-type signaling is present up to a current PDCCH monitoring occasion in the first time window.

18. The base station according to claim 6, wherein the first-type signaling and the second-type signaling both comprise a target field; the target field is used for indicating a candidate signaling type corresponding to a physical layer signaling to which it belongs out of Q2 candidate signaling types, the Q2 being a positive integer greater than 1, and the first-type signaling and the second-type signaling are one candidate signaling type among the Q2 candidate signaling types respectively;
   or, the first-type signaling may be any DCI format among P1 DCI format(s), and the second-type signaling may be any DCI format among P2 DCI format(s); at least one common DCI format is comprised in the P1 DCI format(s) and the P2 DCI format(s), the P1 and P2 being positive integers respectively.

19. The base station according to claim 16, wherein the first information group comprises L pieces of sub-information, among which only one piece of sub-information is used for indicating whether the scheduling of the first signaling is correctly received; first sub-information in the first signaling is used for determining the one piece of sub-information out of the L pieces of sub-information, or first sub-information in the first signaling is used for indicating the L; the first information group is transmitted on a physical-layer channel; the L is a positive integer greater than 1; at least one piece of the L pieces of sub-information in the first information group is used for indicating whether the scheduling of the second-type signaling is correctly received.

20. The base station according to claim 16, wherein the first time-frequency sub-resources and the second time-frequency sub-resources are respectively reserved for two CORESETs; or, the first time-frequency sub-resources and the second time-frequency sub-resources are respectively reserved for two search spaces.

* * * * *